No. 616,888. Patented Jan. 3, 1899.
A. T. BROWN.
TYPE WRITING MACHINE.
(Application filed Dec. 3, 1896.)
(No Model.) 10 Sheets—Sheet 1.
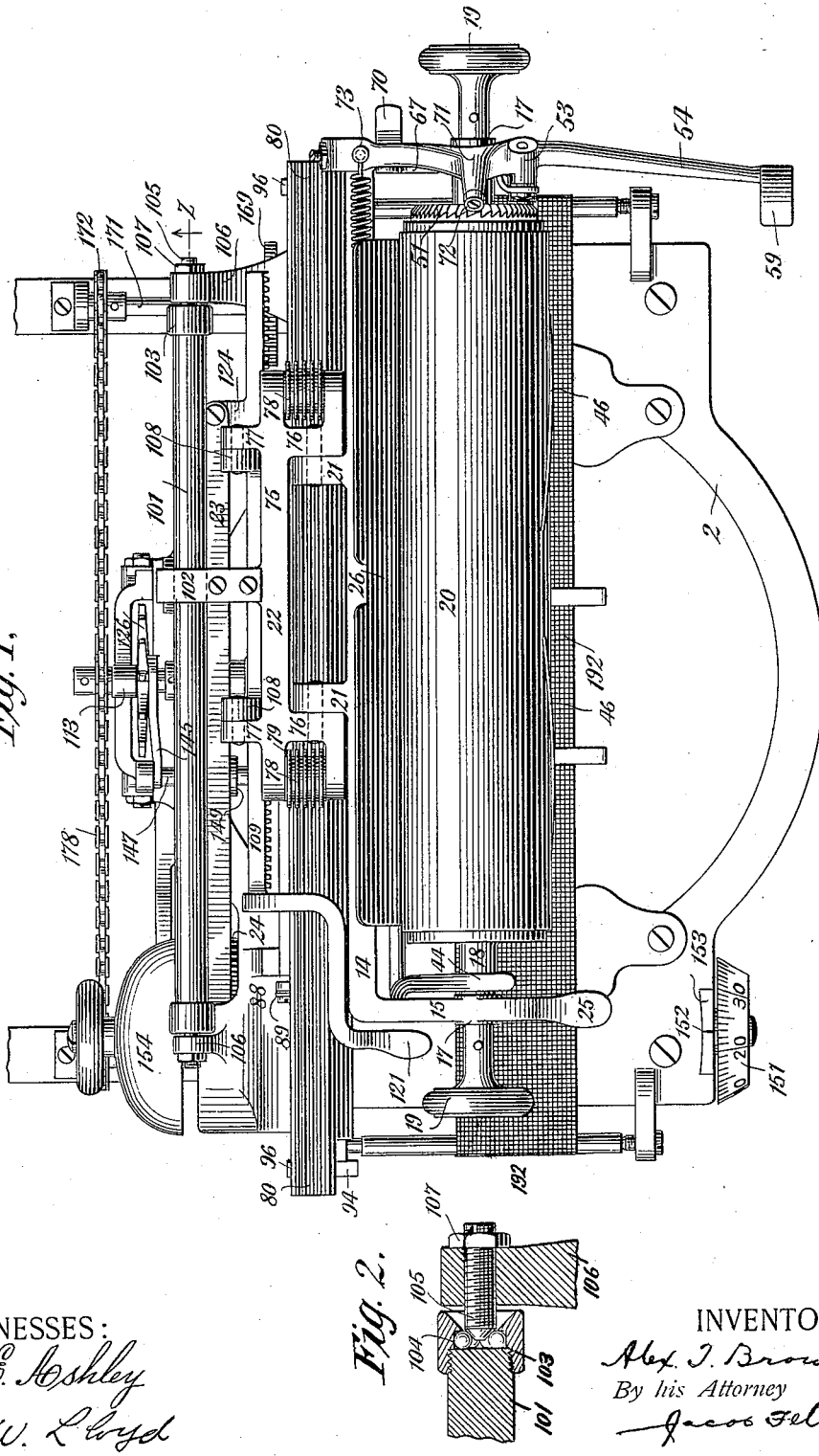
WITNESSES:
C. E. Ashley
H. W. Lloyd
INVENTOR:
Alex. T. Brown
By his Attorney
Jacob Felbel No. 616,888. Patented Jan. 3, 1899.
A. T. BROWN.
TYPE WRITING MACHINE.
(Application filed Dec. 3, 1896.)
(No Model.) 10 Sheets—Sheet 2.
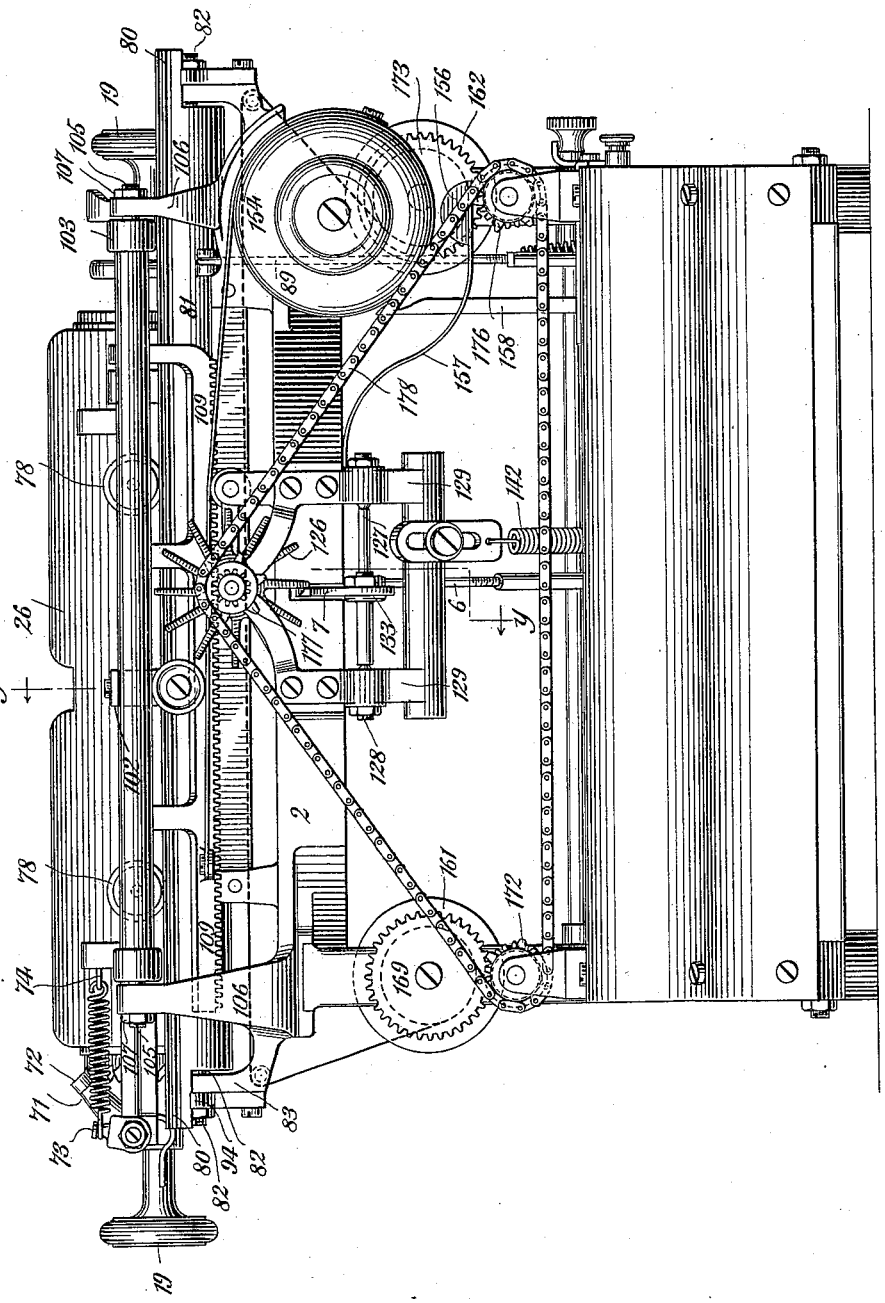
WITNESSES:
C. E. Ashley
H. W. Lloyd.
INVENTOR:
Alex. T. Brown
By his Attorney
Jacob Felbel

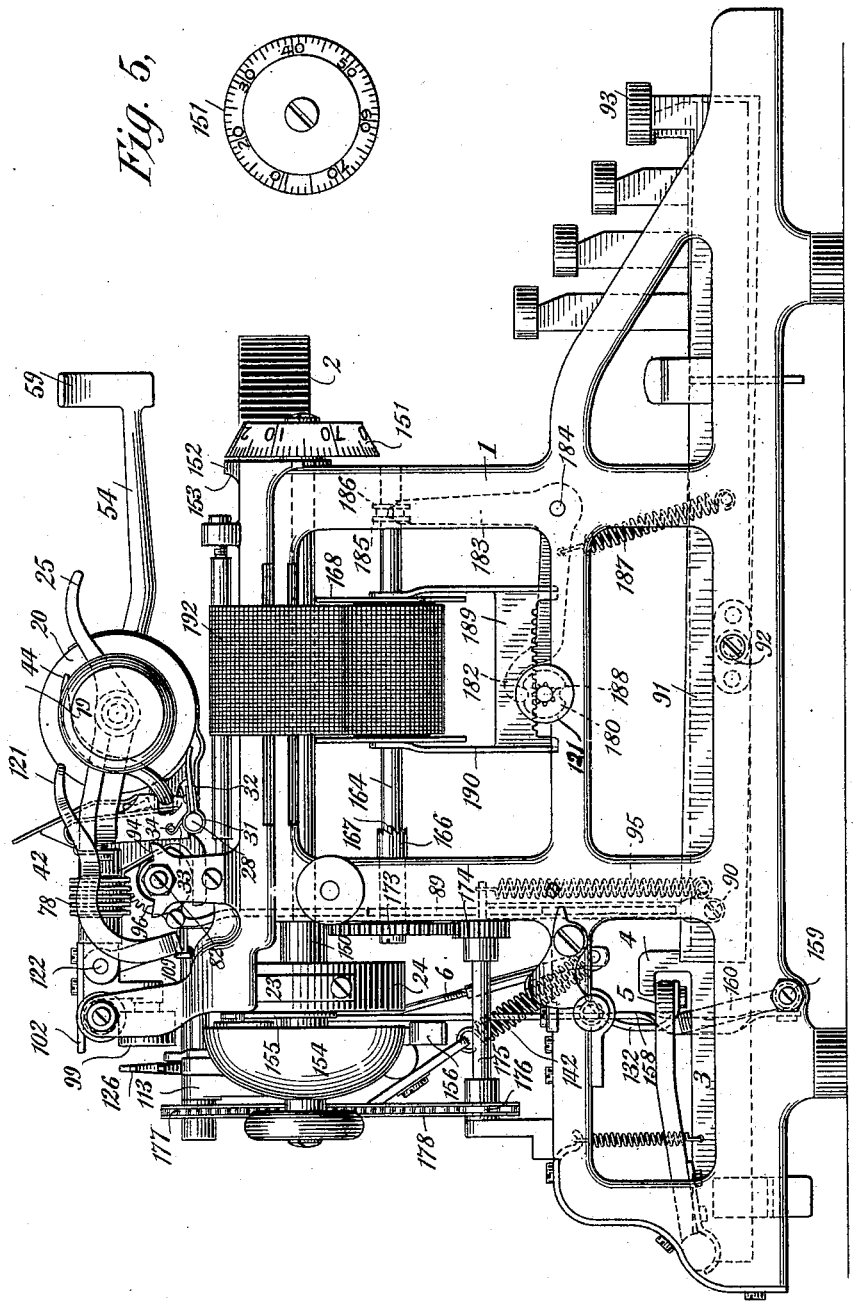

No. 616,888. Patented Jan. 3, 1899.
A. T. BROWN.
TYPE WRITING MACHINE.
(Application filed Dec. 3, 1896.)
(No Model.) 10 Sheets—Sheet 4.
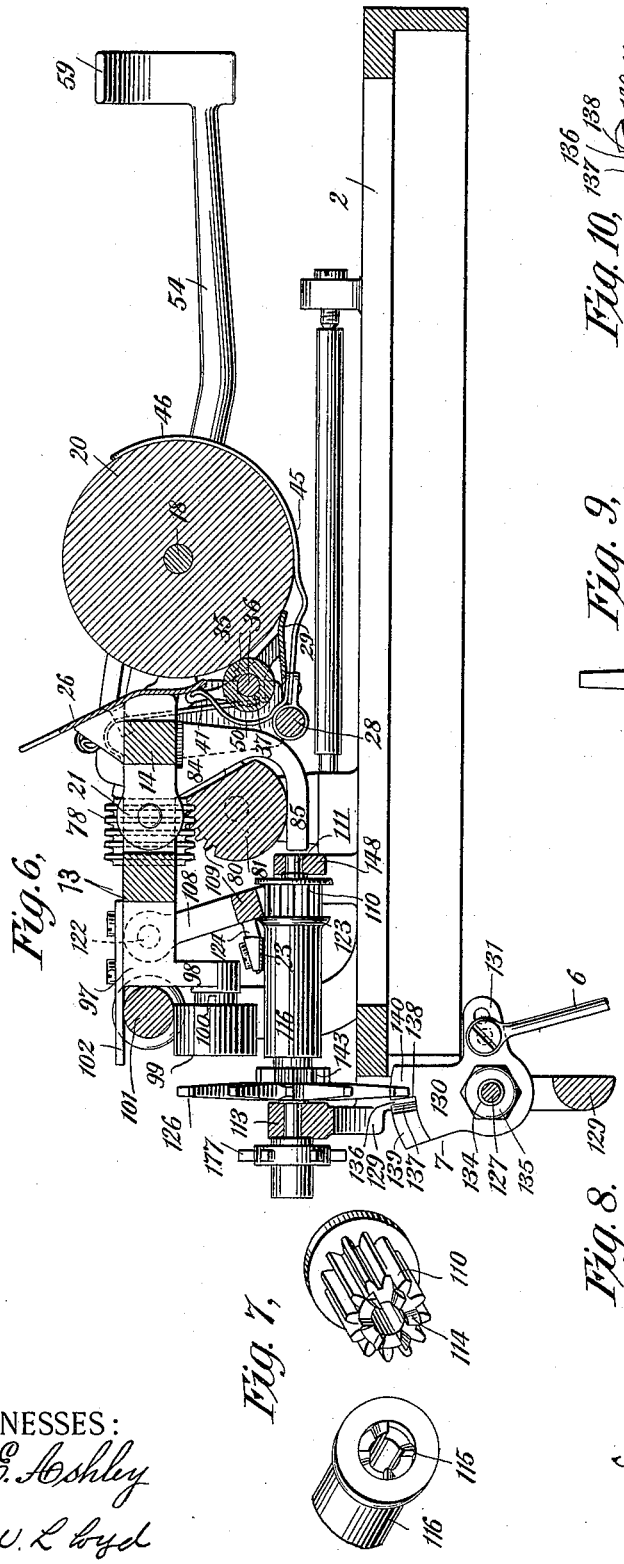
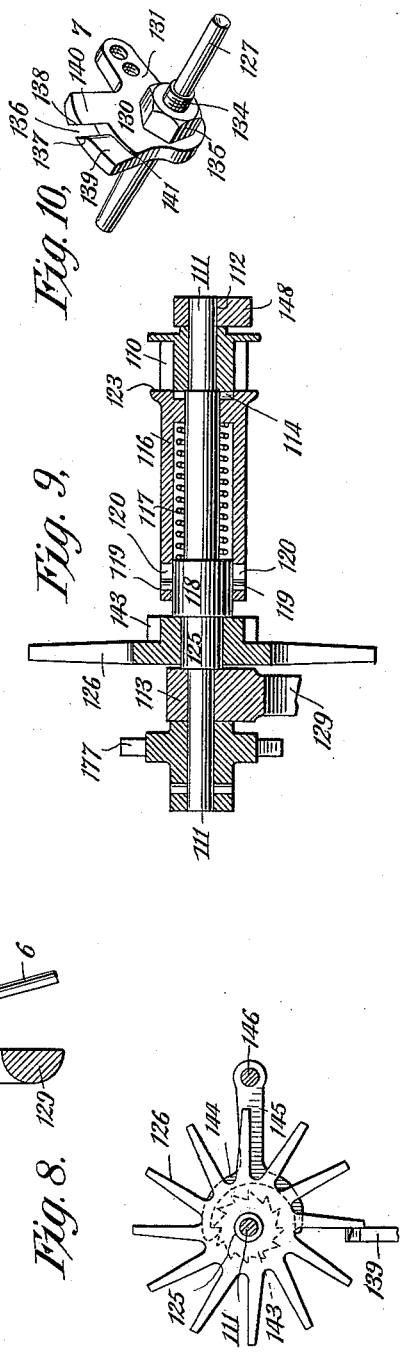
WITNESSES:
C. E. Ashley
H. W. Loyd
INVENTOR:
Alex. T. Brown
By his Attorney
Jacob Felbel

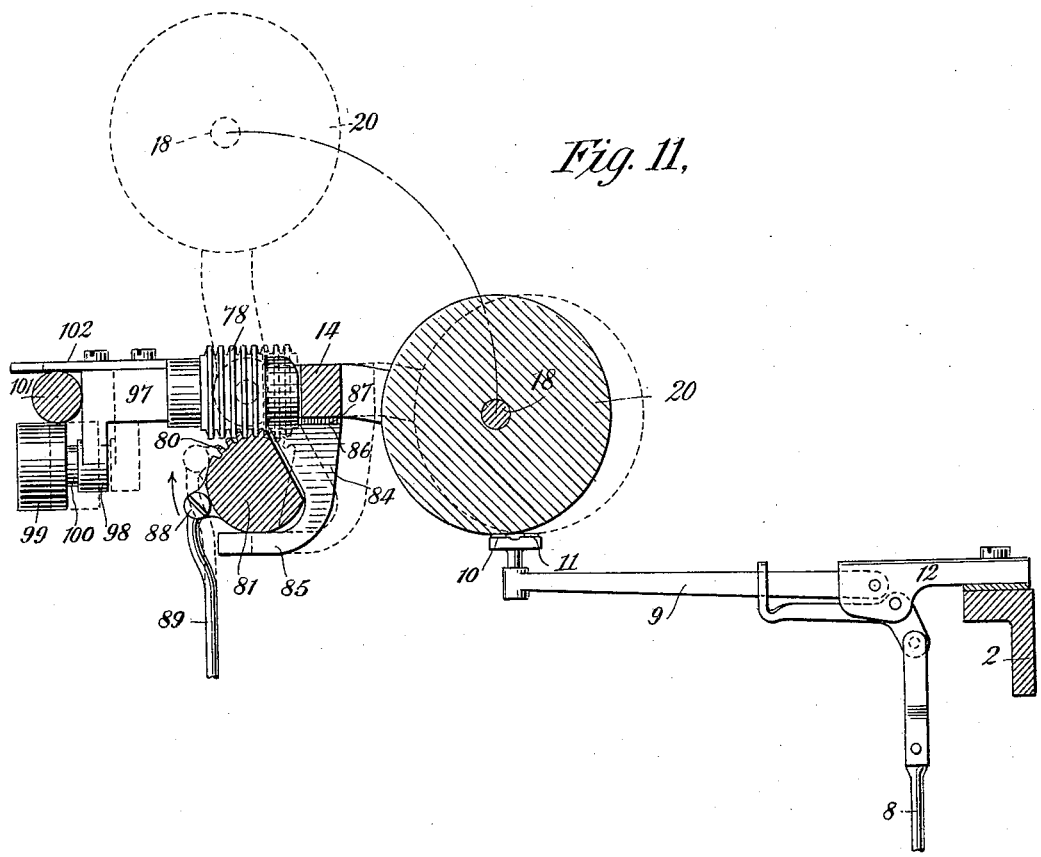

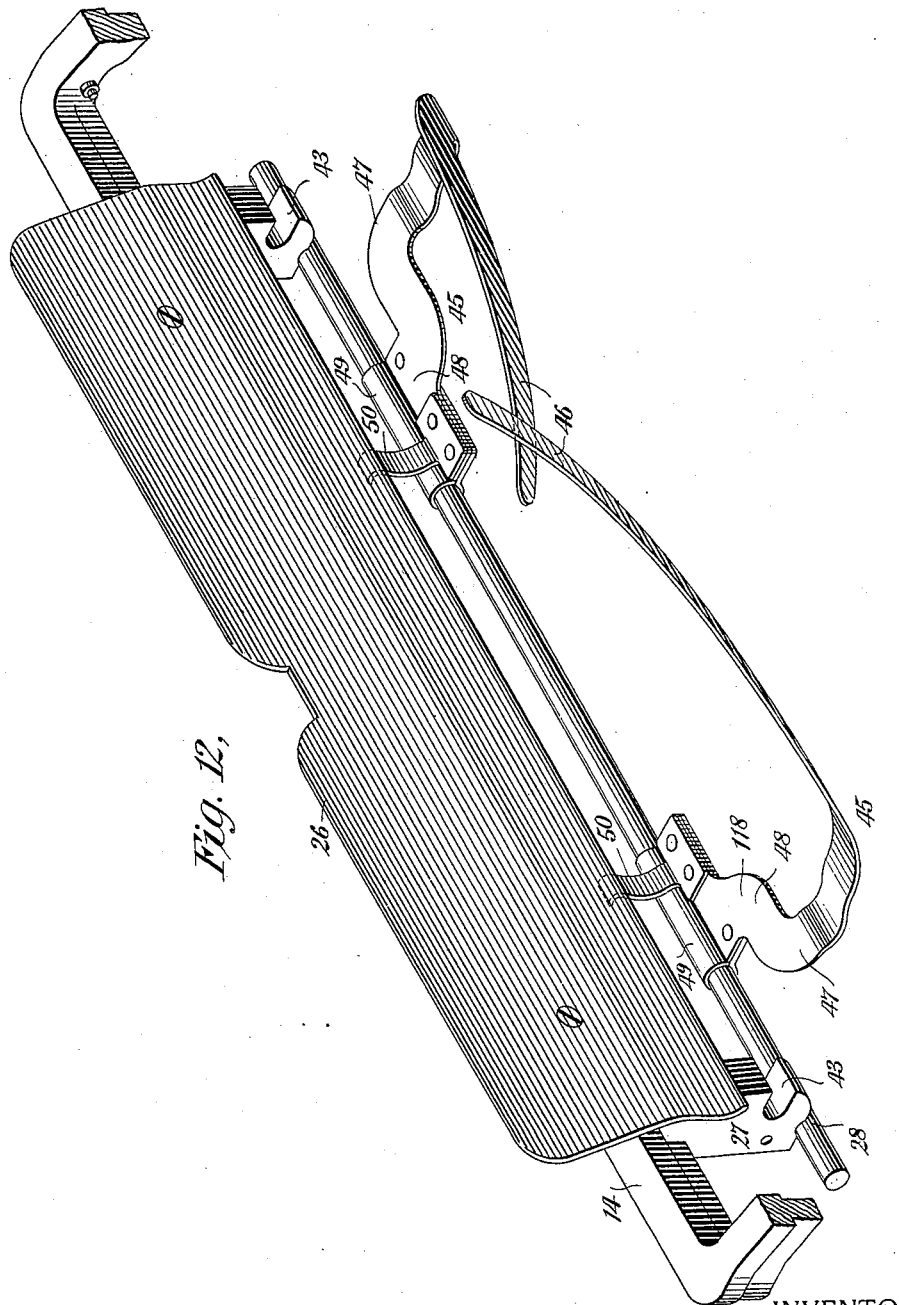

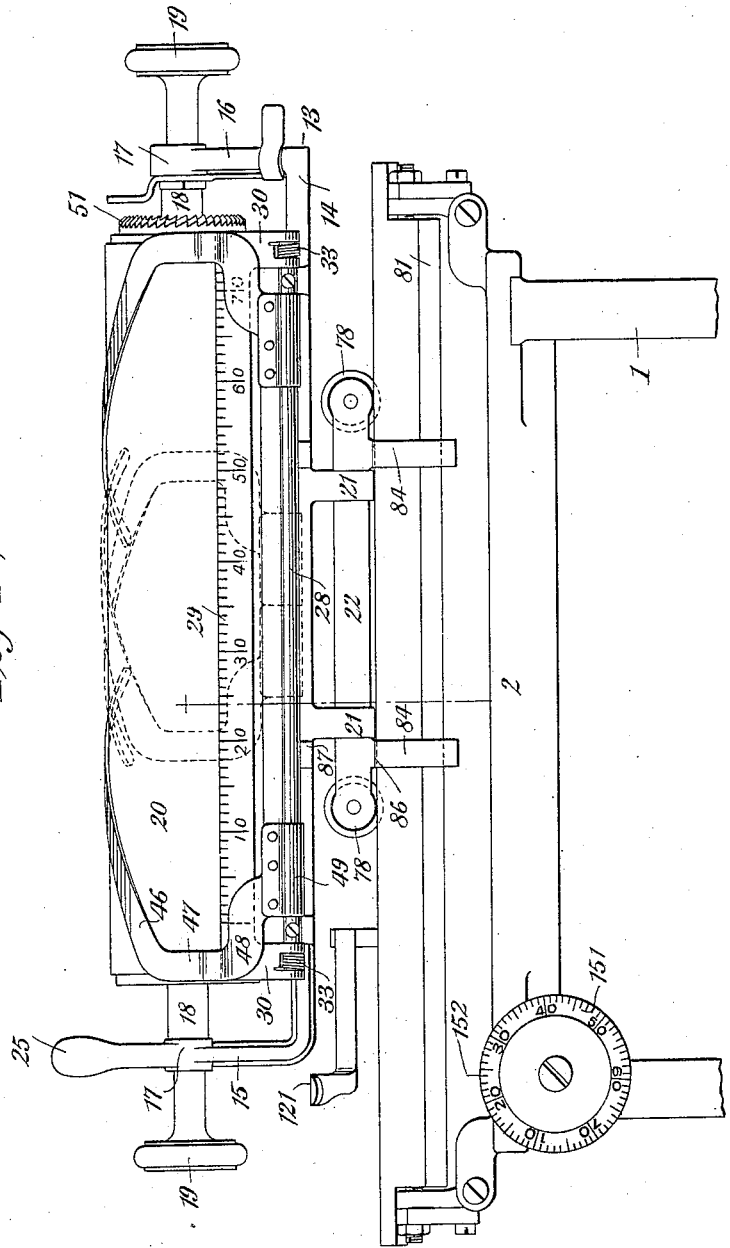

No. 616,888.

Patented Jan. 3, 1899.

A. T. BROWN.

TYPE WRITING MACHINE.

(Application filed Dec. 3, 1896.)

(No Model.)

10 Sheets—Sheet 8.

WITNESSES:
C. E. Ashley
H. W. Lloyd

INVENTOR:
Alex. T. Brown
By his Attorney
Jacob Felbel

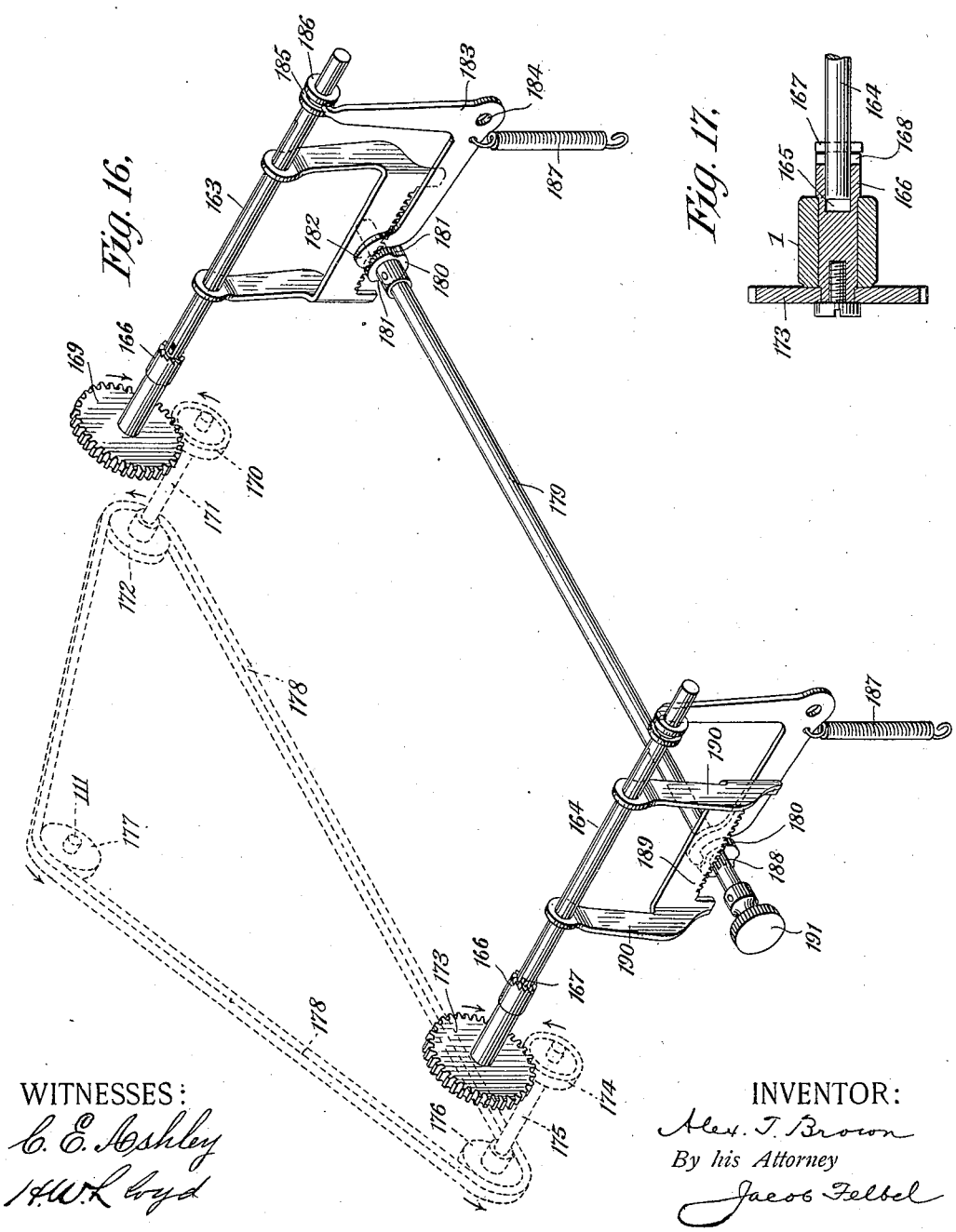

No. 616,888. Patented Jan. 3, 1899.
A. T. BROWN.
TYPE WRITING MACHINE.
(Application filed Dec. 3, 1896.)

(No Model.) 10 Sheets—Sheet 10.

WITNESSES:
C. E. Ashley
I. W. Lloyd

INVENTOR:
Alex. T. Brown
By his Attorney
Jacob Felbel

UNITED STATES PATENT OFFICE.

ALEXANDER T. BROWN, OF SYRACUSE, NEW YORK.

TYPE-WRITING MACHINE.

SPECIFICATION forming part of Letters Patent No. 616,888, dated January 3, 1899.

Application filed December 3, 1896. Serial No. 614,296. (No model.)

*To all whom it may concern:*

Be it known that I, ALEXANDER T. BROWN, a citizen of the United States, and a resident of Syracuse, in the county of Onondaga and State of New York, have invented certain new and useful Improvements in Type-Writing Machines, of which the following is a specification.

My improvements in type-writing machines relate more especially to the platen-carriage, its construction and mode of mounting, the roller-carriage, the shifting mechanism, the line-spacing mechanism, the paper-guides, the feed-roller and paper-blade mounting, the carriage escapement mechanism, the release-key mechanism, the mechanism for moving the ribbon lengthwise, the mechanism for reversing its lengthwise movement, and the mechanism for moving the ribbon crosswise, and various other parts and devices comprising the entire machine, as will hereinafter more fully appear.

My main objects are to devise a simple, durable, and effective type-writing machine; and to these ends my improvements consist in the various features of construction and combinations of devices hereinafter more fully described, and particularly pointed out in the appended claims.

Figure 14:
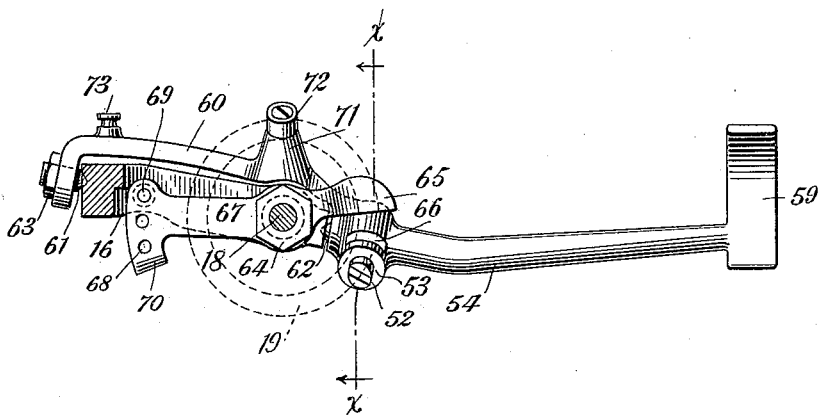
Figure 15:
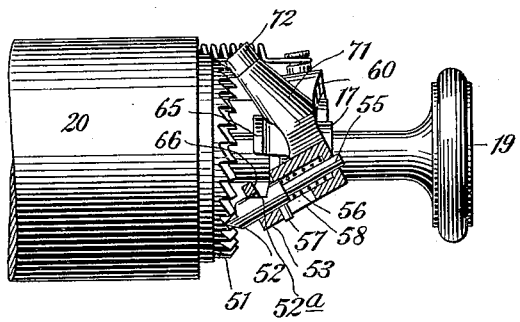
Figure 18:
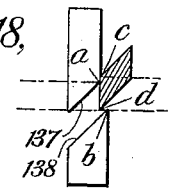
Figure 19:
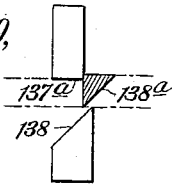
Figure 21:
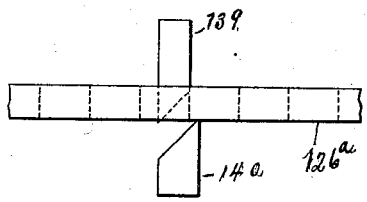
Figure 20:
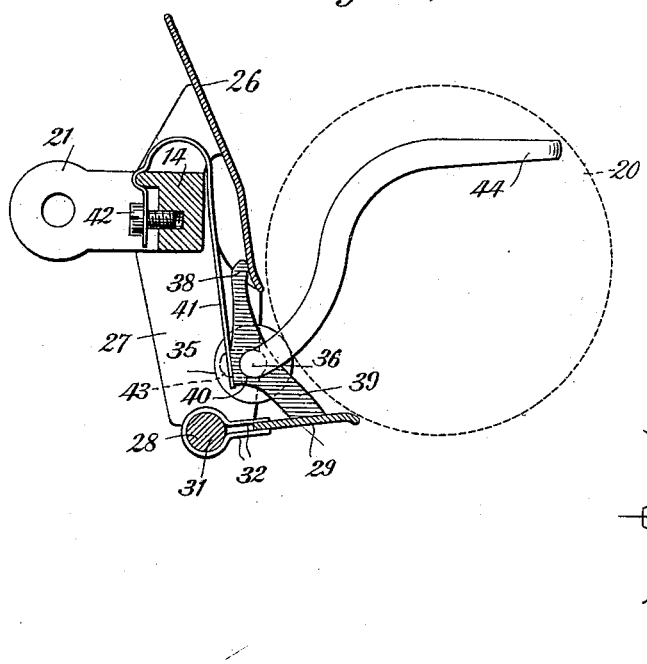
Figure 22:
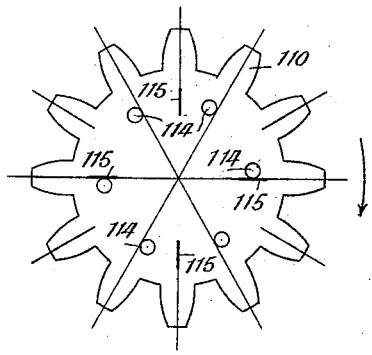

In the accompanying drawings, Figure 1 is a top plan view of a type-writing machine embodying my improvements, the type-bars, key-levers, &c., being omitted. Fig. 2 is an enlarged detail vertical section taken in the plane represented by the line *z* of Fig. 1, showing the mode of mounting the rear carriage-supporting rod or rail. Fig. 3 is a rear elevation of the machine. Fig. 4 is a side elevation thereof. Fig. 5 is a detail front elevation of the dial which indicates the progress and position of the carriage. Fig. 6 is an enlarged vertical section taken at the line *y y* of Fig. 3. Fig. 7 shows rear detail perspective views of the escapement-wheel, driving-pinion, and clutching devices. Fig. 8 is a detail view of the escapement-wheel, escapement-dog, and detent. Fig. 9 is a longitudinal vertical section through the driving-pinion, clutch escapement-wheel, sprocket-wheel, &c. Fig. 10 is a detail perspective view of one form of the feed-dog, forming a part of the escapement mechanism. Fig. 11 is a sectional elevation showing more particularly the mode of mounting and shifting the carriages and showing also a type-bar provided with two types. Fig. 12 is an enlarged perspective view of a portion of the platen-carrier and made more particularly to disclose the construction and arrangement of the paper-guides, the platen being omitted for the sake of clearness. Fig. 13 is a front elevation of the upper portion of the machine and with the platen-carrier in its upturned position and the paper-guide shown in adjusted positions by dotted lines. Fig. 14 is a side sectional elevation of the line-spacing mechanism. Fig. 15 is a front sectional elevation of the same, taken at the line *x x* of Fig. 14. Fig. 16 is a perspective view of the ribbon mechanism. Fig. 17 is an enlarged sectional elevation of the clutching devices, &c., employed in connection with the ribbon mechanism. Fig. 18 is a plan view of a modified form of the feed-dog and a cross-section of a modified form of a tooth of the escapement-wheel. Fig. 19 is a similar view of a further modification. Fig. 20 is a side view to show particularly the casting-off mechanism. Fig. 21 is a plan view of the escapement mechanism in which a straight rack is employed. Fig. 22 is a diagrammatic view of the pinion and sleeve clutch mechanism.

In the various views the same part will be found designated by the same numeral of reference.

1 designates the side frames, 2 the type-ring, and 3 the key-levers, pivoted at the rear of the machine and provided each with a hook 4 to bear upon and oscillate the universal bar 5, which, by means of a rod 6, is connected to the feed-dog 7, to be hereinafter more fully described. To each key-lever is also connected, by means of a rod 8, a type-bar 9, having a lower-case and an upper-case type, (designated, respectively, by the numerals 10 and 11,) the type-bar being pivoted in a suitable hanger 12, secured to the type-ring 2. The general construction of the framework, key-levers, universal bar, type-bars, hangers, &c., is well known and, forming no part of my invention, need not be more fully described. Any other key-lever, type-bar, universal bar, &c., may be employed in lieu of that shown.

The platen-carrier (designated as an entirety by the numeral 13) is horizontally arranged and comprises, essentially, a back bar or rod 14, a left-hand end bar 15, and a right-hand end bar 16. Unlike platen-carriers heretofore made this platen carrier or frame is without any front bar or rod, and it is one of the objects of my invention to provide a construction of platen-carrier which shall be without any front whatsoever in order that an unobstructed view may be had of the front of the platen and work by the operator, whereby a greater portion of the writing which has been done on the under side may be inspected without lifting the platen, craning the neck, or necessitating a change of position on the part of the operator. By providing a frontless platen-carrier the operator may, in addition, observe the position and working condition of the ribbon, and also may be visibly informed the instant the paper has escaped from between the scale-plate or pressure-bar and the platen. Moreover, the frontless platen-carrier enables the operator to more readily insert, remove, and adjust paper, envelops, &c., than heretofore.

The forward ends of the side bars 15 and 16 are provided with eyes or bearings 17 to receive and support a platen-axle 18, which may be provided at each end with a hand-wheel 19, by which the platen 20 may be conveniently rotated.

The back bar 14 of the platen-frame is formed with two rearwardly-extending ears 21, which, by means of pins, are hinged or pivoted to a roller-carriage 22, which, through a strap or other suitable connection 23, is connected to the spring driving drum or power 24. By hinging the platen-carrier to the carriage 22 the former may be lifted to a vertical position for inspection and correction of the work, and to facilitate the up and down swinging movements of the platen-carrier the left-hand end bar 15 is preferably provided with a handle 25, extending toward the operator.

A paper-table 26 is secured to the back bar 14, which bar, near each end, is formed or provided with downwardly-projecting hangers or brackets 27, to the under sides of which is secured by screws or otherwise a rod 28. A pressure bar or plate 29, preferably graduated to form a scale, is connected at its ends by downward extensions 30 to the extremities of said rod 28. At each end of the rod 28 is loosely or pivotally mounted an eye 31, having two leaves 32, between which the lower end of the extension 30 is fitted and secured by means of rivets. A small coiled spring 33 encircles the rod 28 and is attached at one end by a pin 34 to the hangers 27 and at its other end bears against the front leaf 32 of the attaching device, which is slotted or bifurcated between its ends for the accommodation of the coils of the spring. The said spring 33 operates to press the bar or scale 29 against the surface of the platen.

35 designates a feed or pressure roller, and 36 its supporting-shaft, made in the form of a round rod, passing through a bushing 37 on the inside of the feed-roller and upon which said bushing rotates. The feed-roller-supporting shaft or rod extends beyond the ends of the feed-roller and at such extended portions is provided with two fixed arms 38 and 39, projecting in opposite directions from a center or hub 40, formed on its rear side with a flat surface, against which bears the lower free end of a flat or bar spring 41, the upper end of which is hooked over the top of the back bar 14 of the platen-carrier and is secured thereto by means of a screw 42 and in a manner such that the tension of the spring may be adjusted by means of said screws, as required. The arm 38 projects upwardly, and its free end is adapted to take a bearing against the rear side of the paper-table 26. The arm 39 projects downwardly and forwardly and is adapted to take a bearing against the rear or upper side of the scale-plate. The pressure-roller shaft 36 is supported at its ends beyond the pressure-roller in horizontal slots 43 on the front sides of the hangers 27, which slots also act as guides for said shaft when the feed-roller and pressure-plate or scale-bar are cast off from the platen. The left-hand end of the feed-roller shaft is prolonged beyond its slot 43 and is bent upwardly and forwardly just past the platen-axle and over it, so as to form a finger-piece 44 for conveniently effecting said casting-off operation. When said finger-piece is depressed toward the platen-axle, the feed-roller shaft is forced rearwardly in its slots by reason of the arms 38 taking a bearing against the rear side of the paper-table, which then serves as a fulcrum for said arms. At the same time under the pressure of the finger-key the arms 39, moving downward slightly, force the pressure-plate or scale outwardly. Thus by the one operation both the feed-roller and the pressure-plate or scale-bar are simultaneously withdrawn from contact with the platen, and hence the paper may be more readily inserted or removed or adjusted. When the pressure is released, the springs 41 return the pressure-roller, its shaft, and the arms 38 and 39 to their normal positions, and the small coiled springs 33 restore the pressure-plate or scale-bar to its normal position.

45 45 are two paper-guides supported on the rod 28 and independently movable thereon, so that they may be adjusted longitudinally of the platen. Each paper-guide comprises, essentially, a finger 46, which extends upwardly and inwardly toward the middle of the platen. This finger is also formed on a curve to substantially match the curvature of the platen. The inner upper end of the finger is free or unattached and preferably bears upon the surface of the platen. The lower end or root of the finger is preferably provided with a downwardly-extended portion 47 and an inwardly-extended portion 48, which by means of rivets is secured to a collar or slide 49, mounted on the cross-rod 28, and provided with a spring 50, whose free end presses against the rear side of the lower end of the paper-table, and by such pressure causes the finger 46 to be maintained in proper relation to the platen. The said spring also acts as a friction device to maintain the collar or slide, and hence the finger, in any position to which they may be adjusted with respect to the length of the platen. The collar or slide 49 may be of any desired construction, but in the example shown it consists of an eye encircling the rod 28, and an outwardly-projecting leaf to which the portion 48 of the guide and the root of the spring 50 are riveted. The portions 47 and 48 overlap the scale bar, and when the slides 49 are pushed outwardly to their fullest extent they abut against the inner faces of the depending hangers 27, and in this position of the slides the vertical portions 47 of the guides are in line with the ends of the platen, as shown at Fig. 13, where I have also illustrated by dotted lines the positions of the guides when the slides have both been moved inwardly a like extent and until their inner ends are caused to abut about centrally of the platen. Each guide is free to be moved for nearly the whole length of the rod—that is to say, with the right-hand guide in its extreme outward position the left-hand guide may be moved over toward the same until its slide contacts with the extremely-located right-hand slide, and vice versa. In the extreme adjusted positions of the guides the free ends of the fingers stand apart a distance of about an inch or so, which fact, however, is of no importance, but when the guides are adjusted to any considerable distance the free end of one finger crosses or overlaps that of the other. Although when the fingers are spread apart they lie practically in the same plane, nevertheless when they are pushed toward each other one of the fingers may readily either ride over or pass under the other, to facilitate which the ends and edges of the fingers may be slightly beveled; but this is not essential, as there is enough flexibility and elasticity in the free ends of the fingers to insure the crossing over of the points.

In the use of the adjustable guides when it may be desired to write upon paper of a width practically equal to that of the length of the platen the guides should be adjusted to their extreme outward positions; but upon feeding in the paper by passing it down between the platen and the pressure-roller and rotating the platen the leading edge of the paper immediately it leaves the bar or scale is guided at its sides by the vertical portions 47 and then immediately thereafter by the angularly-arranged fingers, which, being also curved to accord substantially with the surface of the platen and terminate in a horizontal plane slightly above the axis of the platen, serve to direct the paper as it is advanced upwardly and rearwardly over the platen. When it may be desired to write upon an envelop or shorter sheet of paper at the center of the platen, the guides may be adjusted to the dotted-line position shown at Fig. 13; but it is not essential for writing upon narrow sheets or envelops that both guides should come into play, for one of such guides will suffice for ordinary purposes. By reason of the oblique arrangement of the finger of the guide the leading edge of the paper or envelop is successively brought under the influence of different portions of said finger as the paper is fed forward, so that when the leading edge of the paper reaches the finger-point the paper is affected by the finger for a considerable portion of its (the paper's) width—that is to say, at this time the whole length of the finger is serving to guide and direct the paper, and hence the paper is being acted upon by the finger for a distance widthwise substantially equal to the length of the finger, thus providing practically a comparatively wide guide for the paper without abridging the field for work or reducing the length of the printed line. By having the fingers separate and independent a short sheet or envelop may be run under and guided by one and run over the other finger without abutting thereagainst and crinkling or crumpling the paper or interfering with the feed. This desideratum could not be accomplished if the fingers were united or made of a continuous piece, for it will be seen that if a short sheet or envelop were introduced one side, edge, or end thereof would not be guided at all, and that when the leading end of the sheet or envelop should arrive at or near the apex or joining-point of the fingers the sheet or envelop would be entirely arrested, since one half thereof would be under one of the fingers and the other half or portion over the other finger, and the passage-way being closed no further feed of the paper could take place.

On the right-hand end of the platen is a ratchet-wheel 51, which is adapted to engage a line-spacing pawl or finger 52, arranged to slide in a housing 53, formed on a line-spacing lever 54. The pawl 52 has a reduced portion or stem 55, which is guided in a perforation in the housing and which is surrounded by a coiled spring 56, having a tendency always to throw the pawl outwardly, a pin 57 on said pawl working in a slot 58 in the housing operating to limit the outward movement of the pawl by contact with the end wall of the slot, as shown clearly at Fig. 15.

The line-spacing lever comprises a handle or finger-piece 59 and a yoke 60, which overlies and embraces the right-hand end bar 16 of the platen and is pivotally connected thereto at opposite points 61 and 62, depressions being formed in the extremities of the end bar to admit the entrance of the tapering pins or pivots. The pivot 62 may be formed integral with the yoke and the pivot 61 on the end of a screw to facilitate the attachment of the line-spacing lever as a whole, a set-nut 63 being employed to hold the screw-pivot 61 in position. When the handle or finger-piece 57, which, as will be observed, extends above the line of the pivots, is pressed toward the right, the line-spacing lever is caused to rock or turn, and the pawl or finger 52, which normally projects downwardly and inwardly in operative relation to the ratchet-wheel, engages with a tooth thereof below the center of the ratchet-wheel and on the forward section thereof and causes the ratchet-wheel and the platen to turn the desired extent and gradually advance the paper. This movement of the platen may be regulated to a distance of either one, two, or three notches of the ratchet-wheel, as may be desired. The regulator is made in the form of a lever, and between its ends is supported on a sleeve surrounding the platen-axle and is firmly clamped against the inner face of the hub or bearing 17 of the right-hand end bar by means of a head 64 on said sleeve and made in the form of a nut to receive a wrench, the outer surface of the sleeve being exteriorly threaded at its forward end and screwing into a tapped hole in the bearing 17. The right-hand end of the axle passes through the center of the hub and sleeve. The forward arm 65 of the lever-like regulator overlies the driving-pawl or finger and acts as a stop to the upward movement thereof and to the vibration of the line-spacing lever. The upper side of the housing is preferably cut away, as at 66, and the pawl or finger 52 is slightly notched, as at 52$^a$, to contact with the lower edge of the arm 65, so that said pawl may at the time the line-spacing lever is arrested be itself locked or prevented from sliding backwardly or toward the right, and thus permit the platen to overthrow or pass beyond the desired point, which might otherwise happen if the line-spacing lever should be violently or powerfully actuated.

The rear arm 67 of the line-spacing regulator is formed with three holes 68, one below the other in an arc of a circle. Either one of these holes may be engaged with a small pin 69, projecting inwardly from the end bar 16, so as to hold the regulator-arm 65 at the desired elevation. When the arm 65 is at its lowest point—that is, when the lowest hole 68 is engaged by the pin—the driving-pawl may turn the platen a distance of only one tooth of the ratchet-wheel; but when it is in its highest position, as shown at Fig. 14, then the platen may be rotated a distance of three teeth. Of course when the middle hole is engaged by the pin the platen may be rotated a distance equal to two notches or teeth. The regulator is held firmly in its adjusted position—that is, with the pin and hole in engagement—by reason of the inherent spring of the arm 67, which has a natural tendency outward toward the end bar to set the hole upon the pin. When it may be desired to adjust the regulator, the arm 67 is first pushed inwardly to effect its disengagement from the pin, and then, by means of its finger-piece 70, it is vibrated in either direction as may be required to effect the desired adjustment.

Formed integral with the yoke or end-bar-clasping member of the line-spacing lever is an arm 71, which is inclined toward the ratchet-wheel 51, and at its free end bears a detent in the form of a small antifriction-roller 72, which normally presses against the ratchet-wheel and prevents the platen from turning accidentally during the time of writing. This roller is pressed against the ratchet-wheel by means of a spring, attached at one end to a stud 73 on the yoke and at its opposite end to a hook or eye 74 on a lug projecting up from the back bar of the platen-carrier. This spring always performs the function of returning the line-spacing lever to its normal position when released by the operator. The contruction and arrangement of the line-spacing pawl and the holdfast-roller 72 are such that the platen may be rotated in either direction by the application of force to it or to the hand-wheels on the ends of the platen-axle. When line-spacing is effected by the line-space lever, the detent is simultaneously thrown off, thus relieving the ratchet-wheel of friction and rendering easier the operation.

The roller-carriage or yoke 22, as will be seen more particularly at Fig. 1, comprises a longitudinal bar 75, a bifurcated portion 76 at each end, and also near each end a rearwardly-extended lug 77. The ears 21 of the platen carrier or frame extend between the inner sides of the bifurcated portions 76 and are hinged or pivotally connected thereto. Between the forks of each of the parts 76 is arranged a roller 78, having a series of parallel circular teeth 79—in the example shown five in number. These teeth are adapted to run in grooves between a series of teeth 80, formed radially on the upper section of a bar 81, which at its ends is supported on pivots or centers 82, extending inwardly from uprights 83, cast with the top plate or type-ring 2. At the forward side of the roller-carriage and formed integral with the bifurcated portions are two downwardly-extended arms 84, which have rearwardly-extended portions 85 to pass under and bear against the bar 81, the said devices 84 85 acting as hooks to prevent the roller-carriage from rising. The front side of the bar 81, which is generally circular in cross-section, is cut away or flattened to escape the rear inclined edge of the tapering portion of each arm 84. These arms also perform the additional and important function of supporting the weight of the platen-carrier and its accessories, and for this purpose each of said arms is formed or provided with a horizontal ledge or shoulder 86 to receive the back bar 14 or a slightly-projecting integral lug 87 thereon when the platen-carrier is in its down or working position. The platen-carrier being without the usual front bar and supporting-roller and track or way is supported entirely when in working position by the arms 84. The rear end of the platen-carrier at this time is prevented from rising under the superior weight of the suspended forward portion of the platen-carrier containing the platen, &c., by means of the hinge-pins and lugs or ears at the hinge-line of the platen-carrier and roller-carriage. When the platen-carrier is turned up to the dotted-line position shown at Fig. 11, it is supported by the contact of the upper edge of the paper-table with the rearwardly-projecting lugs 77. Although I have provided supports for the platen-carrier at points between the platen and the hinge-line of the carrier, the supports may be arranged at other points or positions, although I prefer the construction and arrangement shown.

At near the left-hand end and at the rear side of the pivoted, toothed, and grooved bar 81 is provided a lug, to which is pivoted at 88 the upper end of a connecting-rod 89, which is pivotally attached at 90 to the rear end of a shift-key lever 91, fulcrumed at 92 and provided at its forward end with a button or key 93, marked "Upper case." The bar 81 normally occupies the position shown in full lines at Fig. 11; but when the shift-key 93 is depressed the rear arm of its key-lever rises, pushes up the connecting-rod, and the latter causes the bar 81 to oscillate forward, the extent of the oscillation being defined by a stop 94 on a plate secured to the upright 83 and against which the front edge of the bar 81 strikes. A spring 95, attached at one end to the frame and connected at its other end to the connecting-rod 89, causes a return of all the parts when the pressure upon the key 93 is released, and the return movement of the oscillating bar 81 is limited by a corresponding stop 96, arranged on the opposite side of the stop-plate secured to said upright 83 and against which the rear edge of the bar strikes. There is preferably a pair of stops on each side of the machine. When the key 93 is depressed and the bar 81 is oscillated forward, the teeth 80 thereof successively engage or mesh with the teeth or grooves of the toothed rollers 78 and cause the roller-carriage and the platen-carrier attached thereto to move forwardly transversely, or toward the operator, so as to bring the line of print to the center, at which the upper-case types print, as illustrated by the dotted lines at Fig. 11. During such transverse shifting movements of the carriage the bar 81 acts as a pinion or toothed sector and the rollers 78 as short racks. When the carriage moves in the direction of the length of the platen, the said bar 81 acts as a track or guide for the carriage and the said rollers turn freely about their pivots to serve in their usual or ordinary capacity to reduce the friction and render easy the movement of the carriage. It will thus be seen that the device 81 has a twofold function—to wit, it acts as a carriage support and guideway or track and also as a shifter-bar. The bar being toothed and grooved for its entire length, it may of course be employed to shift the platen at any and all points in its line of traverse.

Extending rearwardly from the bar 75 of the roller-carriage is an arm 97, having a downward extension 98, to which is applied an antifriction-roller 99, which is mounted upon a pin or pivot 100. The said roller is arranged to contact with the under side of a long revoluble bar 101, which acts as a guide for the roller-carriage and which also prevents the same from rising or lifting at its rear side when the platen-carrier is down and its weight is suspended by said carriage. When the platen-carrier is turned up, the roller-carriage is prevented from dropping at its rear side by means of a plate or finger 102, secured to the arm 97 and projecting rearwardly over the said long guide-bar 101. This plate or finger is arranged very close to the surface of said rod; but preferably it does not touch the same when the platen-carrier is down or in working position. When, however, the platen-carrier is turned up, the said finger or plate bears upon the top of said bar and prevents the said roller-carriage from being tilted or depressed at its rear side. The rear guide-bar is preferably mounted so as to be capable of turning axially during the shifting movements of the carriage, and thereby reduce friction and the exertion of shifting to the minimum. To this end the said bar 101 is threaded at each end and provided with a cup or box 103, within which is arranged in an annular track or bearing a set of antifriction-balls 104, which bear and turn upon the beveled or conical end of a screw 105, projecting inwardly from an upright or standard 106 and securely retained in position by a set-nut 107. When the carriage is shifted for upper-case work, the roller 99, in contact with the under side of the bar 101, operates to partially rotate said bar first in one direction and then in the opposite as said roller is moved forth and back transversely of said bar. The roller 99 is elongated or made of such a width as that in either its normal or shifted position it will not lose contact with said rod. Inasmuch as the roller 99 and the plate or finger 102 move together as one in the shifting operation and are arranged on opposite sides of the center of said bar it will be seen that the best results are to be obtained by having the said finger stand normally out of contact with said bar, as before explained, so as not to oppose and resist the rotative motion imparted to said bar by the roller 99; but of course the shifting may nevertheless be effected successfully with both the roller and the finger in contact with the rotatory bar. It will be understood, of course, that when the carriage travels longitudinally the said bar remains stationary and the roller turns freely on its pivot as it travels along in contact with said bar and that when the shifting of the carriage is performed the said bar turns on its axis and the said roller slides transversely in contact therewith without rotating. The device 99 may be a mere bearer, non-rotative, if desired.

Between the pair of rearwardly-projecting lugs 77 is a pair of pivoted arms 108, carrying at their lower ends a rack or toothed bar 109, the teeth of which always engage with the radial teeth of a pinion 110, loose upon a shaft 111, arranged at right angles to the rod 101 and mounted in suitable supports or bearing 112 and 113. On the outer or rear end of the pinion, which preferably has twelve radial teeth, as shown at Fig. 7, are formed six rearwardly or axially extended teeth 114, which are normally in engagement with two or four forwardly-projecting teeth 115 on the inner end of a sleeve 116, also mounted on said shaft or axle 111 and provided interiorly with a returning-spring 117. Projecting outwardly or radially from a collar or enlargement 118 on said shaft 111 are two pins 119, which enter slots 120, arranged longitudinally in the said sleeve 116, and by means of which slots the said sleeve is capable of sliding longitudinally for a limited distance on said shaft 111 in order that it may be unclutched from and reclutched or engaged with said pinion 110. The unclutching or disengaging of said sleeve from said pinion is effected by said rack or toothed bar 109 when the latter is swung or forced rearwardly, and which may be conveniently accomplished by means of a finger-piece 121, which is preferably provided or formed by bending the end of the rack-bar upwardly and forwardly and then laterally toward the left, and finally forwardly again in proximity to the left-hand end bar 15 of the platen-carrier, as shown at Figs. 1 and 4. When said finger piece or key 121 is pressed down, the rack-bar 109 is forced rearwardly about its pivots 122 as a center, and the rear side of the rack-bar, pressing on a shoulder or flange 123 of the sleeve 116, causes the latter to be slid rearwardly on its shaft or bearing to the extent provided for by the slots 120, and which is sufficient to effect a disengagement between the teeth 114 and 115, or, in other words, an unclutching of the sleeve from the pinion. When the pressure is released from the finger-key, the spring 117 restores these parts to their normal clutched condition, and in which condition, when the pinion is rotated by the rack, the sleeve and the shaft are also rotated; but when the sleeve is disengaged from the pinion to permit rapid movement of the carriage and the traveling rack rotates the pinion in such movement the sleeve, and hence the shaft and its adjuncts, remain at rest. The driving power or spring-drum 24 is connected through the strap 23 preferably to an arm 124, projecting rearwardly from the toothed bar 109 at near its right-hand end.

Beyond the rear end of the sleeve 116 and fast on an enlargement 125 on the shaft 111 is secured an escapement-wheel 126, having preferably twelve comparatively long teeth, with which coöperates the feed-dog 7, which is of peculiar construction and directly clamped or secured upon a rock-shaft 127, supported by pivots or centers 128 in a framework or bracket 129, screwed to the top plate or type ring and of which the bearing 113 forms an integral part. The feed or escapement dog, Figs. 6 and 10, comprises an upright plate-like portion 130 and a forwardly-projecting arm 131, to which is attached the connecting-rod 6, whose lower end is connected to the universal bar 5 through a curved arm 132, Fig. 4. At the lower end of the plate-like portion 130 is a perforation to enable the feed-dog to be slipped upon the rock-shaft 127 and up against a shoulder or enlargement 133, Fig. 3, formed at about the middle thereof. A portion of said rock-shaft is screw-threaded at 134 to receive a clamping-nut 135, which securely binds the feed-dog against said shoulder 133. The upper end or working portion of said feed-dog is slotted or cut through transversely to provide a passage-way 136 for the teeth of the escapement-wheel. The slot or passage-way being obliquely formed or cut on an angle, there are provided or formed two inclined or beveled walls 137 and 138, parallel with each other. The beveled face 137 is on the branch or member 139 and the beveled face 138 on the branch or member 140, and both branches are in the plane of movement of the dog, or one directly behind the other or in the same plane. The branch 139 is slightly thinner than that marked 140, which is of the full thickness of the plate 130. In other words, the vertical plane of the right-hand face of the branch 139 (considered from the rear of the machine) is nearer the vertical center of the plate 130 than the vertical plane of the right-hand side of the branch 140, the stock being cut away, as indicated at 141, and the purpose of this construction is to afford the tooth of the escapement-wheel a slight "drop" during the downstroke of a finger-key, and thereby insure its passage through the slot 136 on the upstroke of said key. In the normal condition of the parts a tooth 126 of the escapement-wheel presses against the right-hand face of the branch 140 under the force of the driving-spring and is resisted by said branch. When any character-key or space-key is depressed, the said dog 7 is rocked forward and the branch 139 brought over quickly to arrest said tooth, which, however, at this time may drop or rotate slightly in consequence of the removal of the metal at 141. In other words, at this stroke of the key the tooth 126 steps from the branch 140 to the branch 139 and is arrested thereby before the carriage makes its letter-space movement. This partial rotation or stepping-in movement of the tooth brings the lower working end or portion opposite the right-hand edge of the beveled face 138, or, in other words, brings it to a position such that on the return stroke of the dog it is obliged to pass through the slot 136 thereof. Hence when the pressure on the key is released and while the dog is returning to its normal position under the influence of the usual returning-spring 142 said active tooth of the escapement-wheel vibrates transversely through the slot 136 to effect a letter-space movement of the carriage, and at the conclusion of such movement the next tooth of the escapement-wheel strikes against and is arrested by the branch 140. In the spacing operation when the face of the branch 139 has receded to such an extent that it ceases to restrain the tooth the right-hand end or side of the slot 136 is then opposite to or registers with said tooth, and hence the latter may pass quickly through said slot. The forward rocking motion of the dog on the downstroke of the key is only sufficient to bring the inner or forward portion of the flat surface 139 into the path of vibration of the escapement-wheel tooth, so that in the return movement of the dog said tooth slips through the passage-way 136 almost the instant the pressure on the key is released, thereby providing for a rapid letter-space movement. In the return movement of the dog if the movement of the tooth through the passage-way should be slow the beveled face 138 will act to force said tooth through said slot, and in said movement of the dog if the latter should be tardy in its action the tooth of the escapement-wheel acting on the beveled face 137 will operate to quicken the return movement of the dog.

In the modification shown at Fig. 18 the feed-dog is of substantially the same construction as that shown at Fig. 10; but the teeth of the escapement-wheel are differently constructed in cross-section. As shown at Fig. 18, the tooth is made in the form of a rhomb in cross-section, with the front and rear parallel sides parallel with the faces 137 and 138 of the dog. The distance between the points $a$ and $b$ on the dog is slightly less than that between the points $c$ and $d$ on the tooth of the wheel, so that when the tooth steps off from $b$ it will strike fairly on $a$ and be arrested and so that when the tooth begins to move transversely it will be obliged to pass through the slot of the dog.

Referring now to the modification shown at Fig. 19 it will be observed that in place of the beveled face 137 the dog has a straight or square face $137^a$ and that the escapement-wheel tooth in cross-section is made triangular and with its slanting side $138^a$ parallel with the beveled face 138 of the dog. It will be seen that this construction is substantially the same as that shown at Fig 18, the main difference being that one-half of the tooth shown at Fig. 18 is employed and that a straight or square face $137^a$ is used instead of a slanting or beveled wall, and by which construction, Fig. 18, a larger opening or slot is provided for the passage of the tooth.

While I have thus far described my invention in respect to the escapement mechanism carried out in connection with an escapement-wheel or circular rack, it will be understood that the same may be advantageously embodied in that well-known form of escapement mechanism in which a straight or square rack is used and as illustrated in plan at Fig. 21. In Fig. 21 the reference $126^a$ indicates an old and well-known rack-bar used in type-writing-machine escapements, and 139 and 140 are dogs similar in construction and mode of operation to those hereinbefore described, and shown in Figs. 10 and 18.

It will be understood from the foregoing description that the carriage-driving spring through the roller-carriage and the rack-bar 109 tends always to turn the pinion 110, and that the pinion through the clutched sleeve and pins 119 tends always to turn the shaft 111 and its escapement-wheel. When the machine is at rest or when no pressure is applied to a key at the keyboard, the tendency of the driving-spring to turn the parts, and hence move the carriage, is resisted by one of the teeth of the escapement-wheel pressing upon the face of the branch 140 of the dog, and it will also be understood that this tendency is further resisted whenever one of said teeth also presses upon the face of the branch 139; but, as hereinbefore explained, when the branch 139 recedes from the tooth the carriage is permitted to move forward a letter-space distance. When, however, it may be desired to run the carriage forward without operating the escapement mechanism, the release-key 121 is pressed upon and the sleeve 116, which turns the shaft, is moved out of engagement with the pinion, thus releasing the carriage from the normal restraining influence of the escapement-wheel and branch 140 of the dog. When the release-key 121 is relieved of pressure, the spring 117 within the sleeve causes a reëngagement of the teeth 114 and 115. In returning the platen to the right for the beginning of a new line the escapement-wheel remains stationary and the sleeve is reciprocated back and forth in consequence of the presence of the teeth 114 and 115. These teeth are flat on one side and spiral or beveled on the other, and when the machine is at rest two diametrically opposite flat faces of two diametrically opposite teeth 114 press against the flat faces of two diametrically opposite teeth 115, and this pressure tends to rotate the sleeve, and thereby the shaft, and press one tooth of the escapement-wheel against the branch 140 of the dog. When the carriage is retracted or pressed toward the right, the pinion is turned in a direction opposite to that in which it is turned by the driving power, and the beveled or spiral backs of its teeth successively force or wedge the sleeve rearwardly, which is permitted by the slots 120. As each tooth of the pinion slips past a tooth on the sleeve the spring 117 shoots the sleeve forward again into reëngagement with the pinion.

There are twelve radial teeth on the pinion 110, and the pitch of said teeth is one-tenth of an inch, or equal to that of a letter-space distance, and said teeth are arranged at thirty degrees apart. The six teeth 114 on the end of said pinion are arranged at sixty degrees apart, while the four teeth 115 on the sleeve are arranged at ninety degrees apart. By this construction and arrangement I obtain twelve locking or stopping positions in one revolution of the pinion. At each one-twelfth of a backward revolution of the pinion (which is equal to a letter-space distance) there is a disengagement and reëngagement between the teeth 114 and the teeth 115, and hence the carriage will remain where it may happen to be when the retracting push or pull thereon ceases, and by this construction and arrangement when the carriage is released for rapid forward movement the teeth 114 and 115 will reëngage and stop the carriage immediately the pressure on the release-key is removed. By referring to the diagram at Fig. 22 it will be seen more clearly how I am enabled with only six teeth on the end of the pinion and four teeth on the end of the sleeve to stop the pinion twelve times in one revolution thereof. In this view it will be observed that when either pair of diametrically opposite teeth on the sleeve is in contact with any pair of the three pairs of diametrically opposite teeth of the pinion each of the remaining teeth on the sleeve stands midway between two adjacent teeth on the pinion, and hence that the pinion will be next engaged by these two teeth when it turns a distance equal to half the distance between the pitch of its teeth, or, in other words, when the pinion makes one-twelfth of a revolution. The normal tendency of the pinion is to turn in the direction of the arrow, but when the carriage is retracted it turns in the opposite direction.

In order to prevent the escapement-wheel from rotating backwardly during a recession of the carriage an extent sufficient to permit the tooth in advance of the one engaged by the dog to strike against the left-hand side of the dog, the hub of the escapement-wheel 111 is provided with a ratchet-wheel 143, with which engages a pawl 144 at the farther end of an arm 145, pivoted or loosely hung at 146 on a transverse short revoluble shaft 147, supported at one end in the bracket 129 and at its opposite forward end in a longitudinally-arranged bar 148, which also contains the bearing 112 of the shaft 111. On this cross-shaft 147 is formed a circular enlargement 149, and upon which rests and runs the driving-band 23.

The drum or casing 24, containing the carriage-driving spring, in the usual manner, is mounted upon a shaft 150, which turns in bearings in the framework and is prolonged to extend forward to the front side of the top plate, where it is provided with a dial or wheel 151, having its periphery graduated to correspond with the letter-spacing of the carriage. The dial or wheel is made frusto-conical and the lines of graduation are made from the apex of the cone, which would coincide with the center of the shaft. In the machine shown there are seventy subdivisions or marks of graduation on the dial corresponding to the capacity of the carriage in letter-space movements, and these lines are so disposed as that at each letter-space movement of the carriage a succeeding line or mark will by the rotation of the dial come to register or aline with a fixed mark, pointer, or index 152 on the top plate, which at this locality is preferably formed with a curved or arc-shaped flange 153, raised to a height about even with that of the upper side of the dial at its rear or base end. As customary with straight scales, every tenth subdivision is preferably marked. By making the dial in frusto-conical form, as illustrated, the upper or working side of the same has a downward and forward slant, whereby the graduations and marks may be more readily read or observed than would be the case if the dial were made cylindrical. Preferably the dial is located at the left-hand corner of the top plate or type ring, where it may be most conveniently read, and since it rotates step by step proportionately to the step-by-step movement of the carriage it serves always to indicate the progress and position of the carriage, and hence to answer the purpose of the usual front carriage-scale and pointer of other machines.

On the shaft 150, carrying the spring-drum and dial, may also be located the bell 154 and an adjustable bell-hammer trip 155, adapted to a bell-hammer 156 on the end of a spring-arm 157, secured to the framework, and said bell-trip may also actuate a line-locking mechanism, comprising a pull-rod 158, rock-shaft 159, and the stopping-arms 160, adapted to rock under the universal bar 5, whereby the printing mechanism may be locked at any desired point; but since this mechanism and the bell mechanism form no part of my invention they need not be more fully described.

I shall now describe the ribbon-moving mechanism:

161 designates the right-hand ribbon-spool, and 162 the left-hand ribbon-spool, viewed from the front of the machine, and these spools are mounted to rotate with and slide upon shafts marked, respectively, 163 and 164, which shafts at their forward ends are mounted in suitable supports or bearings in the framework 1. The rear end of each shaft is supported in a socket or housing 165 in the inner or forward end of a hub 166, adapted to rotate in a bearing in the framework 1. At near the end of each spool-shaft is fixed a cross-pin 167, adapted to engage with annular ratchet-teeth 168, cut on the inner end of said hub, and by means of which engagement the said shaft is rotated. To the outer end of each hub is secured a spur-gear, the right-hand one being numbered 169. With this gear meshes a toothed pinion 170 on a short shaft 171, mounted in suitable bearings and having at its rear end a sprocket-wheel 172. The left-hand spur-gear is marked 173 and is engaged by a toothed pinion 174 on a shaft 175, having at its rear end a sprocket-wheel 176. Secured to the escapement-wheel shaft 111 is a sprocket-wheel 177, and banded around said sprocket-wheels 172, 176, and 177 is a chain or driving-belt 178, which is itself driven by the sprocket-wheel 177 and in turns drives the sprocket-wheels 172 and 176 in the directions indicated by the arrows at Fig. 16. The driving sprocket-wheel 177 is driven by the carriage-driving spring, since it is secured to the escapement-wheel shaft, and said sprocket-wheel makes a partial revolution at each letter-spacing movement of the paper-carriage. As the escapement-wheel shaft 111 rotates only in one direction, the driving chain or band 178 is driven always in the same direction, and as said escapement-shaft turns only step by step during the forward letter-feed movements of the carriage the gearing comprising the driving-band, sprocket-wheels, pinions, and spur-gears also rotate the ribbon-spool shafts and spools, and hence feed the ribbon lengthwise or from one spool to the other only during the letter-spacing or printing movements of the paper-carriage. It has been shown heretofore that the escapement-wheel shaft does not rotate during the return movement of the paper-carriage nor during a rapid forward movement of the paper-carriage when the release-key 121 is put into operation. Of course when one spool-shaft is in engagement with its driving clutch or hub the other one is out of engagement with its associated clutch or hub, and hence the latter runs freely in its bearings and permits its spool to pay off the ribbon as the opposite spool is turned in the proper direction to take on the ribbon. At Fig. 16 the left-hand spool-shaft is shown as in engagement with its clutch or hub and the right-hand spool-shaft as out of engagement with its clutch or hub, and therefore in this condition of the mechanism the spool on the shaft 164 is the winding-spool and that on the shaft 163 the unwinding-spool.

The means for unclutching or disengaging the shaft 164 from its driver and clutching the shaft 163 with its driver when the spool on the shaft 164 has become full and it is necessary to reverse the direction of movement of the ribbon will now be described.

Extending across the machine and suitably supported in the framework is a rod or shaft 179, which at near each end is formed or provided with a collar 180, having two diametrically opposite notches or indentations 181, adapted to receive the inner hook-like end 182 of the horizontal arm of a bell-crank 183, which is pivoted at 184 on the framework. The upper free end of the vertical arm of said bell-crank is bent to enter a groove 185 in a collar 186, secured at near the front end of the ribbon-spool shaft. A coiled spring 187, secured at one end to the framework and at the opposite end to the bell-crank, serves to keep the hook-like end 182 in operative engagement with the notched collar 180 and to also slide the ribbon-spool shaft, as will hereinafter more fully appear. At Fig. 16 it will be observed that the notched collars 180 are arranged crosswise of each other—that is to say, their arrangement is such that when one of the hooks 182 is in engagement with one of the notches 181 the other of said hooks is out of engagement with both of the notches of its associated collar and bears upon the raised part or periphery of the collar. It will also be observed in Fig. 16 that the hook 182 is in engagement with the notch 181 at the left-hand side, the left-hand spool-shaft being in clutch or engagement with its driver, which engagement is maintained under the tension or power of the spring 187 and is supplemented by the catching or holding functions of the hook and notch, which prevent accidental displacement or disengagement of the parts.

When the spool on the shaft 164 becomes full and it is necessary to reverse the longitudinal travel of the ribbon, the shaft 164 is unclutched and the shaft 163 clutched, which is effected simply by giving to the shaft 179 one-quarter of a revolution. By thus turning the shaft the raised portion of the collar on the left-hand end of the shaft, acting as a cam, operates to lift the hook out of its notch to vibrate the bell-crank and cause the vertical arm thereof to slide the shaft 164 endwise forward, and thus withdraw its cross-pin 167 from engagement with the ratchet-teeth 168 on the driving-hub. At the same time when either of the notches at the right-hand end of the shaft is carried around to register with the hook 182 of the right-hand bell-crank the point of the hook drops into said notch under the tension of the spring 187, and simultaneously the vertical arm of the bell-crank forces the right-hand spool-shaft 163 endwise rearwardly and causes its cross-pin or teeth 167 to engage with the ratchet-teeth of its associated driver, thereby putting the mechanism into a condition such that thereafter the shaft 163 becomes the winding-shaft and the shaft 164 the unwinding-shaft. Of course when the spool on the shaft 163 becomes full the switch-shaft 179 is again given a quarter of a turn and the said spool-shafts 163 and 164 are simultaneously moved endwise in opposite directions again to disengage the shaft 163 and reëngage the shaft 164 in order that the ribbon may be returned step by step upon the spool of the left-hand shaft. The bell-cranks, as well as the ribbon-spool shafts, act simultaneously, but in opposite directions. While the power of the hand is being used to vibrate one bell-crank and slide its associated spool-shaft to effect a disengagement of the latter the spring on the opposite bell-crank is exerting its force to vibrate said bell-crank in the opposite direction and slide its associated spool-shaft to effect its working engagement with the driving mechanism, the power having been stored in the spring by the previous unclutching or disengaging hand action.

The switching-shaft 179 may be turned in either direction and is employed for the additional purpose of imparting to the ribbon a crosswise feed, which is so arranged as to take place simultaneously with the reversing of the longitudinal movements of the ribbon, as will now more fully appear.

At near each end of the shaft 179 is formed or provided a set of teeth or a small pinion 188, meshing with a set of teeth or a rack-bar 189, arranged transversely of the shaft 179 and forming a part of a ribbon-carrier consisting of said rack-bar and two vertical arms 190, having perforations at their upper ends by which they are supported in a pendent manner from the ribbon-spool shaft. The upper ends of the arms 190 embrace the heads of the ribbon-spool, so that when the ribbon-spool carriers are moved transversely they act to carry both spools simultaneously, and the spool-shafts and the rack-bars 189 being parallel and of equal length the ribbon-spools are moved along their shafts in unison, and the ribbon is carried transversely and in parallel steps during such movements. The rack-bars are moved endwise, of course, by rotating the shaft 179, during which its pinions 188 drive the said bars, and for the purpose of facilitating its movements the left-hand end of the shaft 179 is provided with a button or finger-piece 191, extending beyond the framework.

It will be understood from the foregoing description that the means for reversing the longitudinal travel of the ribbon 192 and the means for moving said ribbon crosswise or in the direction of its width operate simultaneously and by a rotating movement of the actuating-shaft 179. I have preferred to so proportion the parts as that during the quarter-turn employed to shift the ribbon-spool shafts the pinions and racks shall move the ribbon crosswise about one-eighth of an inch, and also to make the racks of such length as that the ribbon may be moved or stepped crosswise six times in each direction. The shaft 179 is turned partially six times in one direction to carry the ribbon rearwardly and then six times in the opposite direction to carry the ribbon forwardly.

By the means described it will be seen that it is assured that the ribbon will be fed crosswise a certain distance each time the direction of rotation of the ribbon-spools is reversed, and without the necessity of any thought or attention to such side-shifting of the ribbon on the part of the operator. In this sense the crosswise movement of the ribbon is automatic in its action and takes place every time it becomes necessary to reverse the longitudinal travel of the ribbon. It will be understood, of course, that the movement of the ribbon in the direction of its length may be reversed at any stage of its travel without waiting for the end of the ribbon to be reached or waiting for the paying-off spool to become empty.

Various changes in detail construction and arrangement may be made as to the parts comprising the several features of my invention without departing from the spirit thereof, and of course many of my improvements are adapted for use in machines varying greatly in plan and general construction from the machine herein shown and described.

What I claim as new, and desire to secure by Letters Patent, is—

1. In a type-writing machine in which the type print on the under side of the platen, the combination of a frontless platen-carrier, a carriage located wholly in rear of the platen, and means on said carriage in rear of the platen for supporting said carrier, substantially as described.

2. In a type-writing machine in which the type print on the under side of the platen, the combination of a frontless platen-carrier, a carriage located wholly in rear of the platen in its working position, said carrier being hinged or pivoted to said carriage, and a stop or stops on said carriage for the carrier, whereby the platen is suspended over the printing-point, substantially as described.

3. In a type-writing machine in which the type print on the under side of the platen, the combination of a frontless platen-carrier, and a carriage located wholly in rear of the platen in its working position and having shoulders or ledges, said carrier being hinged to said carriage in rear of said shoulders or ledges and adapted to rest on said shoulders or ledges when the platen is suspended in working position, substantially as described.

4. In a type-writing machine, the combination of a carriage, a supporting track or way therefor, arms on said carriage embracing the under side of said track or way to hold said carriage against rising and formed with shoulders or ledges, and a platen-carrier hinged to said carriage and adapted to be wholly supported by said shoulders or ledges; substantially as set forth.

5. In a type-writing machine, the combination of a carriage lying and supported entirely in rear of the platen, a platen-carrier pivoted to said carriage and suspended or supported by the carriage in front of the said pivot, and means for preventing the carriage from tilting under the weight of the said carrier and platen, substantially as described.

6. In a type-writing machine, the combination of the carriage, a turn-up platen-carrier supported at its rear side only by the front side of said carriage and so that the platen is held suspended entirely in front of said carriage, and means for holding the carriage from tipping or displacement under the weight of the platen and its carrier; substantially as set forth.

7. In a type-writing machine, the combination of a carriage, a track or way therefor upon which said carriage travels, one or more arms on said carriage extending under said track or way, a relatively fixed guide-bar, a bearer arranged to contact with the under side of said guide-bar, and a platen-carrier suspended from said carriage, said carriage, track and guide-bar being wholly in rear of the platen; substantially as set forth.

8. In a type-writing machine, the combination of a carriage, a track or way upon which said carriage travels, one or more arms adapted to bear against said track or way, a relatively fixed guide-bar parallel with said track or way and in rear thereof, a roller or bearer at the rear side of said carriage adapted to travel in contact with the under side of said bar, and a platen-carrier connected to and supported wholly by said carriage, said carriage, track and guide-bar being wholly in rear of the platen; substantially as set forth.

9. In a type-writing machine, the combination of two parallel carriage-guide bars, a carriage provided with rollers which travel on top of one of said guide-bars and with a roller or bearer which travels on the under side of the other of said guide-bars, said carriage and rollers being shiftable transversely of said bars, and a platen-carrier hinged to and suspended from said carriage at its front side and shifting therewith; substantially as set forth.

10. In a type-writing machine, the combination of two parallel guide-bars, a carriage provided with rollers which travel on top of one of said bars, and with one or more arms which bear against the under side of said bar, and also provided with a roller which travels on the under side of the other of said bars, and with a contact device for the upper side of the last-mentioned bar, said carriage and rollers being shiftable transversely of said bars, and a platen-carrier hinged to and suspended from said carriage at its front side; substantially as set forth.

11. In a type-writing machine, the combination of a guide-bar, a carriage provided with rollers to run on top thereof and with one or more depending contacting arms, a platen-carrier pivoted to said carriage and resting on said arm or arms, a second parallel guide-bar, a roller on said carriage adapted to travel on the under side of said second guide-bar, and a plate or device on said carriage overhanging the upper side of said guide-bar for contact therewith, said carriage-rollers, arms and plate being shiftable transversely of the bars or guides to move said platen and carrier transversely thereof; substantially as set forth.

12. In a type-writing machine, the combination of a guide-bar, a carriage having rollers adapted to travel thereupon, a platen-carrier hinged to and supported wholly by said carriage, a platen, and means for turning said guide-bar for shifting said carriage and platen; substantially as set forth.

13. In a type-writing machine, the combination of a pivoted guide-bar provided longitudinally with a series of teeth, a platen, and a carriage having one or more toothed rollers whereby the carriage and the platen may be shifted when said bar is turned on its pivots; substantially as set forth.

14. In a type-writing machine, the combination of a platen, a carriage having toothed rollers, and an oscillatory toothed shifter; substantially as set forth.

15. In a type-writing machine, the combination of a carriage having toothed rollers, an oscillatory toothed shifter-bar for said rollers, and a platen-carrier attached to said carriage; substantially as set forth.

16. In a type-writing machine, the combination of a carriage having rollers, a shifter-bar upon which said rollers travel, and a platen-carrier hinged to and supported wholly by said carriage in front of said shifter-bar; substantiallly as set forth.

17. In a type-writing machine, the combination of a carriage having rollers, a shifter-bar upon which said rollers travel, a platen-carrier hinged to and supported by said carriage with the platen in front thereof, and means for preventing the tipping of said carriage by the weight of the suspended carrier and platen, substantially as described.

18. In a type-writing machine, the combination of a platen, a carriage having rollers, a shifter-bar upon which said rollers run, a guide-bar parallel with said shifter-bar, and a roller or bearer on said carriage adapted to travel in contact with said guide-bar and also to shift transversely thereof with said carriage; substantially as set forth.

19. In a type-writing machine, the combination of a platen, a carriage having rollers, an oscillatory shifter-bar upon which said rollers run, a rotatable guide-bar parallel with said shifter-bar, and a roller or bearer on said carriage adapted to travel in contact with said roller-guide bar and also to shift transversely thereof with said carriage; substantially as set forth.

20. In a type-writing machine, the combination of a carriage having toothed rollers, a platen-carrier hinged to said carriage, an oscillatory toothed shifter-bar in mesh with said rollers, a rotatable guide-bar, and a roller or bearer on the carriage adapted to travel in contact with said bar and also to shift transversely thereof with the carriage and platen-carrier; substantially as set forth.

21. In a type-writing machine, the combination of a platen, a carriage having toothed rollers, an oscillatory toothed shifter-bar for said rollers, a key-lever mounted to oscillate said shifter-bar, a returning-spring, and means for limiting the oscillation of said shifter-bar in both directions; substantially as set forth.

22. In a type-writing machine, the combination of a platen, a carriage having toothed rollers, a toothed shifter-bar pivoted at each end, a stop on each side of the pivotal axis of said shifter-bar, a key-lever connected to said shifter-bar for turning it in one direction, and a spring for restoring it to its normal position; substantially as set forth.

23. In a type-writing machine, the combination with a platen and a shifting carriage having an elongated roller or bearer, of a revoluble guide-bar with which said roller or bearer coöperates; substantially as set forth.

24. In a type-writing machine, the combination of a platen-carrier, a platen mounted to rotate therein and having a ratchet-wheel on one end, and a line-spacing lever pivoted on said platen-carrier and carrying both a line-spacing pawl and a detent, which detent acts normally to hold the platen, but moves away therefrom when the line-spacing lever is actuated and the driving-pawl is engaged in turning the platen; substantially as set forth.

25. In a type-writing machine, the combination of a platen-carrier, a platen mounted to rotate therein and having a ratchet-wheel on one end, a line-spacing lever pivoted to said platen-carrier and provided with a driving-pawl and also with a detent, and a single spring connected at one end to the line-spacing lever and at the other end to the platen-carrier and so arranged as to return the line-spacing lever when released after the line-spacing operation and to also cause the detent to bear against the platen ratchet-wheel; substantially as set forth.

26. In a type-writing machine, the combination of a platen-carrier, a platen mounted to rotate therein and having at one end a ratchet-wheel, a line-spacing lever formed with a yoke to embrace the end bar of the platen-carrier and having pivots disposed in the direction of the length of said yoke whereby the line-spacing lever may rock or oscillate, a line-spacing pawl, and a returning-spring; substantially as set forth.

27. In a type-writing machine, the combination of a platen-carrier, a platen mounted to rotate therein and having at one end a ratchet-wheel and a spring-returned line-spacing lever pivoted to rock on said platen-carrier, a driving-pawl on said lever engaging said ratchet-wheel below the axis of the platen, and a detent on said lever engaging said ratchet-wheel above the axis of the platen; substantially as set forth.

28. In a type-writing machine, the combination of a platen-carrier, a platen mounted to rotate therein and having at one end a ratchet-wheel, a line-spacing lever formed with a yoke to embrace the end bar of the platen-carrier and having pivots disposed longitudinally thereof, an arm rising from said yoke and formed or provided with a detent, a spring-pressed sliding driving-pawl mounted in a housing in said line-spacing lever, and a lever-returning spring; substantially as set forth.

29. In a type-writing machine, the combination of a platen-carrier, a platen mounted to rotate therein and having at one end a ratchet-wheel, a line-spacing lever provided with a driving-pawl, and a regulator made in the form of a lever, one arm of which is adapted to arrest the vibration of the line-spacing lever, and the other arm of which is provided with a finger-piece and with means for holding said regulator in various positions to control the line-spacing movements; substantially as set forth.

30. In a type-writing machine, the combination of a platen-carrier, a platen mounted to rotate therein and having at one end a ratchet-wheel, a line-spacing lever provided with a driving-pawl, a regulator pivoted between its ends coincident with the platen-axle, one arm of which is adapted to limit the vibration of the line-spacing lever, and the other arm of which has a lateral spring tension and is provided with a finger-piece and with a series of holes or depressions to engage a fixed pin on the platen-carrier; substantially as set forth.

31. In a type-writing machine, the combination of a platen, a platen-carrier, a spring-pressed pressure-roller, arms extending outwardly from the pressure-roller axle, a bearing or fulcrum for said arms, and a finger-piece connected to said axle in such manner as that when pressed upon said arms bear upon said fulcrum and by their movements cause the pressure-roller to recede from the platen; substantially as set forth.

32. In a type-writing machine, the combination of a platen, a platen-carrier having fixed and slotted brackets, a pressure-roller, a shaft or axle therefor mounted in said slots and provided with arms, a finger-piece connected to said shaft or axle, bearing-points or fulcra for said arms, and pressure-springs; substantially as set forth.

33. In a type-writing machine, the combination of a platen, a platen-carrier having fixed and slotted brackets, a paper-table, a pressure-roller, a pressure-roller shaft or axle mounted in said slots and having a finger-piece, a pair of arms attached to said shaft or axle, and bearing at their free ends against said paper-table, and a pair of springs for holding said pressure-roller normally in contact with the platen; substantially as set forth.

34. In a type-writing machine, the combination of a platen, a platen-carrier, a spring-pressed pivoted bar or plate, a pressure-roller adapted to recede from the platen, a pressure-roller shaft or axle, a pair of arms connected to the latter to cause the retraction of the pressure-roller, and a pair of arms also connected to the shaft or axle and adapted to cause the spring-pressed bar or plate to likewise move away from the platen; substantially as set forth.

35. In a type-writing machine, the combination of a platen, a platen-carrier, a spring-pressed pivoted bar or plate, a pressure-roller, a shaft or axle therefor having a bodily movement away from said platen, a pair of oppositely-projecting arms attached at or near each end of said shaft or axle, one arm adapted to bear against a fulcrum or abutment, and the other arm against the said spring-pressed bar or plate, a finger-piece connected to said shaft or axle, and springs for pressing the latter toward the platen; substantially as set forth.

36. In a type-writing machine, the combination of a platen, a platen-carrier having fixed slotted brackets, a shaft or axle mounted in said slotted portions of said brackets, and adapted to move endwise therein, a finger-piece connected to said shaft or axle, a pressure-roller mounted to rotate upon the latter, a movable bar or plate, a pair of arms attached at or near each end of said shaft or axle, one arm of each pair projecting upwardly and the other downwardly, a bearing for the free ends of the upwardly-projecting arms, the free ends of the downwardly-projecting arms being adapted to move the said bar or plate away from the platen, and springs for forcing the pressure-roller shaft or axle toward the platen; substantially as set forth.

37. In a type-writing machine, the combination of a platen, a platen-carrier having fixed slotted brackets, a pressure-roller shaft or axle mounted therein and provided at one end with an integral upwardly and forwardly extending finger-piece, a pressure-roller mounted to turn on said shaft or axle, a hub mounted at or near each end of said shaft or axle and provided with an upwardly-extending arm and a downwardly-extending arm, a paper-table serving as a bearing for the upwardly-extending arms, a pivoted spring-pressed bar or plate adapted to be actuated by the downwardly-extending arms, and springs for holding the pressure-roller normally in contact with said platen; substantially as set forth.

38. In a type-writing machine, the combination with a platen, of a paper-guide having an obliquely-arranged directing-finger which is free at its point or tip to permit the passage by it of the leading edge of the papers, &c., substantially as set forth.

39. In a type-writing machine, the combination with a platen, of an obliquely-arranged directing-finger mounted for adjustment longitudinally of the platen; substantially as set forth.

40. In a type-writing machine, the combination with a platen, of an obliquely-arranged directing-finger connected to a collar or slide, and a support for the latter arranged parallel with the platen; substantially as set forth.

41. In a type-writing machine, the combination with the platen, of a supporting-rod parallel therewith, a collar or slide adapted to be adjusted thereupon, and an obliquely-arranged directing-finger connected to said collar or slide; substantially as set forth.

42. In a type-writing machine, the combination with a platen, of a supporting-rod parallel therewith, an adjustable collar or slide, an obliquely-arranged directing-finger, and a spring; substantially as set forth.

43. In a type-writing machine, the combination with a platen, of a paper-guide comprising an obliquely-arranged directing-finger free at its point or tip, and the lateral integral members 47, 48, a collar to which the latter member is attached, and a support for said collar; substantially as set forth.

44. In a type-writing machine, the combination with a platen, of a supporting-rod, a collar adapted to slide thereupon and also to rock, a spring attached to said collar, and a paper-guide also attached to said collar and comprising an obliquely-arranged directing-finger; substantially as set forth.

45. In a type-writing machine, the combination with a platen, of a pair of obliquely-arranged directing-fingers each free at its point or tip; substantially as set forth.

46. In a type-writing machine, the combination with a platen, of a pair of independently-adjustable obliquely-arranged directing-fingers; substantially as set forth.

47. In a type-writing machine, the combination with a platen, of a parallel supporting-bar, a pair of collars or slides adjustably mounted thereon and carrying each an obliquely-arranged directing-finger; substantially as set forth.

48. In a type-writing machine, the combination with a platen, of a parallel supporting-bar, and a pair of spring-pressed collars or slides adapted to be adjusted longitudinally thereupon and carrying each an obliquely-arranged directing-finger; substantially as set forth.

49. In a type-writing machine, the combination with a platen, of a pair of adjustable obliquely-arranged directing-fingers, the points or tips of which are adapted to pass by each other; substantially as set forth.

50. In a type-writing machine, the combination with a platen, of a pair of independent and adjustable directing-fingers each of which extends inwardly and upwardly and is curved substantially in accordance with the curvature of the platen; substantially as set forth.

51. In a type-writing machine, the combination of a power-driven carriage, a rack, a transversely-slotted or bifurcated dog the branches of which lie in the same plane, and having one of the walls of said slot slanting or oblique for its whole width and having each of said branches adapted to arrest each tooth of the rack before the tooth passes through said slot, substantially as set forth.

52. In a type-writing machine, the combination of a power-driven carriage, a rack having teeth angular in cross-section, one face of each tooth being oblique or beveled, and a dog having two branches with an intermediate slot, one wall of which is cut on a slant or bevel to match the oblique or bevel face of the tooth; substantially as set forth.

53. In a type-writing machine, the combination of a power-driven carriage, a rack having teeth formed angular in cross-section, one face of each tooth being oblique or beveled, a dog having two branches, the working sides of which are arranged in different parallel planes, and a passage-way between said branches having one of its walls beveled or inclined; substantially as set forth.

54. In a type-writing machine, the combination of a power-driven carriage, a rack having teeth formed triangular in cross-section, a two-branched dog, and a transverse slot or opening, one wall of which is square or at right angles to the movement of the dog and the other wall of which is beveled or slanted; substantially as set forth.

55. In a type-writing machine, the combination of a power-driven carriage, an escapement-wheel, a dog consisting of the plate 130, the arm 131, the oblique slot 136, the branch 139, and the branch 140, a rock-shaft, means for clamping or securing said dog upon said rock-shaft, and a connecting-rod attached at one end to said arm 131 and at its other end connected to the universal bar; substantially as set forth.

56. In a type-writing machine, the combination of a power-driven carriage having a toothed bar, an escapement-wheel, an escapement-wheel shaft, a pinion loosely mounted on said shaft and having clutching-teeth at one end, and a sleeve adapted to rotate and turn said shaft and to slide endwise thereon, and provided also with clutching-teeth adapted to be engaged with and disengaged from said pinion; substantially as set forth.

57. In a type-writing machine, the combination of a power-driven carriage having a toothed bar, an escapement-wheel, an escapement-wheel shaft, a pinion loosely mounted thereon and provided with clutching-teeth, a sliding sleeve also mounted on said shaft and likewise provided with clutching-teeth, and a spring for maintaining said sets of clutching-teeth normally in engagement; substantially as set forth.

58. In a type-writing machine, the combination of a power-driven carriage having a vibratory toothed bar, a pinion adapted to be turned thereby, an escapement-wheel, an escapement-wheel shaft, and a sleeve thereon normally in clutch with said pinion and adapted to be driven thereby so as to rotate said escapement-wheel, and adapted also to be disengaged from said pinion by a swinging or vibratory movement of said toothed bar; substantially as set forth.

59. In a type-writing machine, the combination of a power-driven carriage having a vibratory toothed bar, a pinion adapted to be rotated thereby and having clutching-teeth, an escapement-wheel, an escapement-wheel shaft, and a spring-pressed sleeve connected to said shaft and provided with a set of clutching-teeth to engage with those on the pinion; substantially as set forth.

60. In a type-writing machine, the combination of a power-driven carriage having a toothed bar, a pinion having twelve teeth to engage with said bar and having also six axial or clutching teeth, and a sleeve or clutching device connected to an escapement-wheel driving-shaft and having four clutching-teeth to engage with those on the pinion; substantially as set forth.

61. In a type-writing machine and in an escapement mechanism, a pinion having twelve radial teeth arranged at thirty degrees apart and six clutching-teeth arranged at sixty degrees apart, and a sleeve having four clutching-teeth arranged at ninety degrees apart; substantially as set forth.

62. In a type-writing machine, the combination of a power-driven carriage having a vibratory toothed bar, an escapement-wheel, an escapement-wheel shaft, a pinion and sleeve normally in clutch and adapted to rotate said escapement-wheel, and a key or finger-piece adapted to vibrate said toothed bar to separate the sleeve and pinion to permit rapid movement of the carriage; substantially as set forth.

63. In a type-writing machine, the combination of a power-driven carriage, an escapement-wheel, an escapement-wheel shaft, a sleeve and pinion, and a toothed bar on the carriage adapted both to drive said pinion and to effect a separation between said pinion and said sleeve; substantially as set forth.

64. In a type-writing machine, the combination of a carriage, a spring for propelling the same, an escapement mechanism for effecting the step-by-step feed of said carriage, a driving-band connected to said escapement mechanism whereby said band is moved step by step always in one direction in accordance with the letter-spacing movements of the carriage, a pair of wheels driven by said band, an inking-ribbon, and a pair of ribbon-spools adapted to be connected with and disconnected from said wheels alternately to be rotated step by step by said driving-band; substantially as set forth.

65. In a type-writing machine, the combination of a carriage, a spring for propelling the same, a letter-spacing escapement mechanism, a driving-band controlled thereby and driven always in the same direction, an inking-ribbon and ribbon-spools connected to be driven step by step with said band and switch mechanism for controlling said spools and connecting them alternately with said driving-band; substantially as set forth.

66. In a type-writing machine, the combination of a power-driven carriage, an escapement mechanism therefor including a rotatory shaft, a belt or band adapted to be driven by said shaft, a pair of counter-shafts adapted to be driven by said belt or band, a gear on each of said counter-shafts, a pair of ribbon-spool shafts geared to said counter-shafts, a pair of ribbon-spools, and an inking-ribbon; substantially as set forth.

67. In a type-writing machine, the combination of a power-driven carriage, an escapement mechanism therefor including a rotatory shaft, a sprocket-wheel on said shaft, a pair of counter-shafts having each at one end a sprocket-wheel, an endless band passing around said sprocket-wheels, a pinion on the opposite end of each of said counter-shafts, a pair of ribbon-spool shafts having each a gear-wheel adapted to one of said pinions, a pair of ribbon-spools, and an inking-ribbon; substantially as set forth.

68. In a type-writing machine, the combination of an inking-ribbon, a pair of ribbon-spools, a pair of ribbon-spool shafts, an escapement-wheel shaft connected with the power-driven carriage, a second wheel fixed on said shaft, an endless band on said second wheel, and means intermediate said band and said ribbon-spool shafts for rotating said shafts to move the ribbon longitudinally, substantially as described.

69. In a type-writing machine, the combination of an inking-ribbon, a pair of ribbon-spools, a pair of ribbon-spool shafts, an escapement-wheel shaft connected with the power-driven carriage, a second wheel fast on said shaft, an endless band on said second wheel, a pair of wheels about which said band also passes, and means for connecting either of said wheels with the corresponding ribbon-spool shaft to rotate the same and for simultaneously disconnecting the other of said pair of wheels from the other ribbon-spool shaft, substantially as described.

70. In a type-writing machine, the combination of an inking-ribbon, a pair of ribbon-spools, a pair of ribbon-spool shafts, means for driving said spools by the carriage-power through the letter-space escapement mechanism, a pair of spring-actuated bell-cranks for simultaneously moving said shafts endwise in opposite directions, and a shifter for acting simultaneously on both said bell-cranks; substantially as set forth.

71. In a type-writing machine, the combination of an inking-ribbon, a pair of ribbon-spools, a pair of ribbon-spool shafts, means for driving said spools by the carriage-power through the letter-spacing mechanism, a clutch device at each ribbon-spool shaft whereby the same may be connected to and disengaged from the driving power, a pair of spring-actuated bell-cranks and a switch or shifter provided with means for acting on said bell-cranks; substantially as set forth.

72. In a type-writing machine, the combination of an inking-ribbon, a pair of ribbon-spools, a pair of ribbon-spool shafts adapted to move endwise, means for turning said shafts, a pair of bell-cranks, a pair of springs, and a shaft or shifter provided with devices for alternately vibrating said bell-cranks; substantially as set forth.

73. In a type-writing machine, the combination of an inking-ribbon, a pair of ribbon-spools, a pair of ribbon-spool shafts, a pair of bell-cranks adapted to slide said shafts simultaneously but in opposite directions, a pair of springs, and a shaft formed or provided with oppositely-disposed cams and notches whereby when the shaft is moved a cam is adapted to vibrate one of said bell-cranks against the tension of its associated spring and disengage its associated spool-shaft from the driving power, and at the same time the spring at the opposite bell-crank is adapted to act to vibrate its associated bell-crank in the reverse direction and cause its associated ribbon-spool shaft to move into engagement with the driving power; substantially as set forth.

74. In a type-writing machine, the combination of an inking-ribbon, ribbon-spools, the ribbon-spool shafts 163 and 164, the shaft 179, the notched collars 180 thereon, the bell-cranks 153, and the springs 187; substantially as set forth.

75. In a type-writing machine, the combination with the carriage letter-spacing escapement mechanism, the endless band 178 traveling always in the same direction, the shafts 171 and 175 having respectively pinions 170 and 174, the gears 169 and 173, the hub 166 having annular ratchet-teeth, spool-shafts having cross-pins or teeth to engage with the said ratchet-teeth, the ribbon-spools, the inking-ribbon, the shifter-shaft 179 having the notched collars 180, the bell-cranks 183, and the springs 187; substantially as set forth.

76. In a type-writing machine, the combination of an inking-ribbon, a ribbon-spool, a shaft for said spool adapted to be moved endwise to disengage from and engage with the driving power, a collar having a cam and a notch, and a vertically-arranged spring-actuated bell-crank having one arm engaging said ribbon-spool shaft and the other arm engaging said collar; substantially as set forth.

77. In a type-writing machine, the combination of an inking-ribbon, a pair of ribbon-spools, a pair of ribbon-spool shafts upon which the spools may slide, a pair of U-shaped ribbon-spool carriers embracing said spools between their arms and provided each with a rack on the bar or part connecting said arms, and a hand-shaft provided with a pinion for each of said racks, substantially as described.

78. In a type-writing machine, the combination of an inking-ribbon, a pair of endwise-movable shafts, a pair of bell-cranks, a pair of springs, a hand-shaft having cams and notches or depressions and having also a pair of pinions, a pair of ribbon-spools, and a pair of spool-carriers having each a rack; substantially as set forth.

79. In a type-writing machine, the combination of a traveling carriage shiftable transversely to its direction of travel, a platen-carrier hinged to said carriage at the front side thereof and suspended therefrom and shifting therewith, and means for shifting both carriage and platen-carrier transversely, substantially as described.

80. In a type-writing machine, the combination of a traveling carriage shiftable transversely to its direction of travel and being horizontally disposed, and a platen-carrier hinged on the said carriage and extending forwardly substantially in the plane thereof and supported by the carriage in a suspended condition between the platen and the pivot of the carrier, substantially as described.

81. In a type-writing machine, the combination of parallel guideways, a traveling carriage guided by said ways and shiftable transversely to its line of travel, a platen-carrier hinged to said carriage at the front side thereof and suspended therefrom and traveling and shiftable with said carriage, means for shifting both carriage and carrier transversely, and means for preventing the carriage from rocking while leaving it free to shift transversely, substantially as described.

82. In a type-writing machine, the combination of parallel guideways, a traveling carriage guided by said ways and shiftable transversely thereof and being disposed substantially in a horizontal plane, a platen-carrier hinged to said carriage at the front thereof and suspended therefrom and traveling and shifting therewith and forming substantially a horizontal extension thereof, means on said carriage between said pivot and the platen for supporting said carrier, means for preventing the carriage from rocking while leaving it free to shift transversely, and means for shifting both carriage and platen-carrier, substantially as described.

83. In a type-writing machine, the combination of a rack connected with the carriage, and a bifurcated dog having an opening between its branches oblique to the working faces of the said dog branches, and the said dog branches being arranged in the same plane, substantially as described.

Signed at Syracuse, in the county of Onondaga and State of New York, this 1st day of December, A. D. 1896.

ALEX. T. BROWN.

Witnesses:
NELSON W. KING,
WM. H. HAUR.